(12) United States Patent
Lee et al.

(10) Patent No.: US 8,128,414 B1
(45) Date of Patent: Mar. 6, 2012

(54) SYSTEM AND METHOD FOR THE DEVELOPMENT OF INSTRUCTIONAL AND TESTING MATERIALS

(75) Inventors: Richard James Lee, Aptos, CA (US); Sylvia Tidwell Scheuring, Carmel, CA (US); Brad Hanson, Monterey, CA (US); Bruce A. Hanson, legal representative, Phoenix, AZ (US); Marge Petit, N. Fayston, VT (US)

(73) Assignee: CTB/McGraw-Hill, Monterey, CA (US)

( * ) Notice: Subject to any disclaimer, the term of this patent is extended or adjusted under 35 U.S.C. 154(b) by 2369 days.

(21) Appl. No.: 10/644,061

(22) Filed: Aug. 20, 2003

Related U.S. Application Data

(60) Provisional application No. 60/404,394, filed on Aug. 20, 2002.

(51) Int. Cl.
*G09B 3/00* (2006.01)
(52) U.S. Cl. .................................. 434/322
(58) Field of Classification Search .......... 434/118, 434/322, 362, 350, 365
See application file for complete search history.

(56) References Cited

U.S. PATENT DOCUMENTS

| | | | |
|---|---|---|---|
| 4,958,284 A | 9/1990 | Bishop et al. | |
| 5,059,127 A | 10/1991 | Lewis et al. | |
| 5,308,244 A * | 5/1994 | Hirose | 434/169 |
| 5,395,243 A | 3/1995 | Lubin et al. | |
| 5,421,730 A | 6/1995 | Lasker, III et al. | |
| 5,433,615 A | 7/1995 | Clark | |
| 5,513,994 A | 5/1996 | Kershaw et al. | |
| 5,519,809 A | 5/1996 | Husseiny et al. | |
| 5,558,521 A | 9/1996 | Clark et al. | |
| 5,562,460 A | 10/1996 | Price | |
| 5,565,316 A * | 10/1996 | Kershaw et al. | 434/322 |
| 5,657,256 A | 8/1997 | Swanson et al. | |
| 5,727,951 A | 3/1998 | Ho et al. | |
| 5,752,836 A | 5/1998 | Clark et al. | |
| 5,779,486 A | 7/1998 | Ho et al. | |
| 5,823,789 A | 10/1998 | Jay et al. | |
| 5,827,070 A | 10/1998 | Kershaw et al. | |
| 5,870,731 A | 2/1999 | Trif et al. | |
| 5,879,165 A | 3/1999 | Brunkow et al. | |
| 5,890,911 A | 4/1999 | Griswold et al. | |
| 5,904,485 A | 5/1999 | Siefert | |
| 5,934,909 A | 8/1999 | Ho et al. | |
| 5,934,910 A | 8/1999 | Ho et al. | |
| 5,947,747 A | 9/1999 | Walker et al. | |
| 5,954,516 A * | 9/1999 | Heinberg | 434/322 |
| 5,967,793 A | 10/1999 | Ho et al. | |
| 6,000,945 A | 12/1999 | Sanchez-Lazer et al. | |

(Continued)

OTHER PUBLICATIONS

Tennessee Department of Education Performance Indicator Chart http://www.state.tn.us/education/assessment/tsachrcspi.shtml.*

(Continued)

*Primary Examiner* — Xuan Thai
*Assistant Examiner* — Evan Page
(74) *Attorney, Agent, or Firm* — Rothwell, Figg, Ernst & Manbeck PC

(57) ABSTRACT

Aspects of the present invention provide a system that supports (1) the development and administration of instructional materials and/or programs, (2) the development, administration, scoring, and reporting of assessment materials and/or programs, and/or (3) the integration of instruction with assessment materials and/or programs. The system achieves this by organizing the content in these materials and programs into learning targets and ordering the learning targets to reflect the pre-cursor/post-cursor relationships among the learning targets.

12 Claims, 33 Drawing Sheets

U.S. PATENT DOCUMENTS

| | | | |
|---|---|---|---|
| 6,018,617 | A | 1/2000 | Sweitzer et al. |
| 6,029,043 | A | 2/2000 | Ho et al. |
| 6,039,575 | A | 3/2000 | L'Allier et al. |
| 6,064,856 | A | 5/2000 | Lee et al. |
| 6,077,085 | A | 6/2000 | Parry et al. |
| 6,112,049 | A | 8/2000 | Sonnenfeld |
| 6,118,973 | A | 9/2000 | Ho et al. |
| 6,137,911 | A | 10/2000 | Zhilyaev |
| 6,144,838 | A | 11/2000 | Sheehan |
| 6,146,148 | A | 11/2000 | Stuppy |
| 6,148,174 | A | 11/2000 | Remschel |
| 6,149,441 | A | 11/2000 | Pellegrino et al. |
| 6,159,018 | A | 12/2000 | Clark et al. |
| 6,164,974 | A * | 12/2000 | Carlile et al. .................. 434/322 |
| 6,164,975 | A | 12/2000 | Weingarden et al. |
| 6,183,260 | B1 | 2/2001 | Clark et al. |
| 6,186,794 | B1 | 2/2001 | Brown et al. |
| 6,186,795 | B1 | 2/2001 | Wilson |
| 6,193,521 | B1 | 2/2001 | Clark et al. |
| 6,212,358 | B1 | 4/2001 | Ho et al. |
| 6,259,890 | B1 | 7/2001 | Driscoll et al. |
| 6,285,993 | B1 | 9/2001 | Ferrell |
| 6,301,571 | B1 | 10/2001 | Tatsuoka |
| 6,336,029 | B1 | 1/2002 | Ho et al. |
| 6,341,212 | B1 | 1/2002 | Shende et al. |
| 6,418,298 | B1 | 7/2002 | Sonnenfeld |
| 6,419,496 | B1 | 7/2002 | Vaughan |
| 6,431,875 | B1 | 8/2002 | Elliott et al. |
| 6,442,370 | B1 | 8/2002 | Driscoll et al. |
| 6,484,010 | B1 | 11/2002 | Sheehan |
| 6,606,480 | B1 * | 8/2003 | L'Allier et al. ............... 434/362 |
| 6,658,412 | B1 | 12/2003 | Jenkins et al. |
| 6,663,392 | B2 | 12/2003 | Leyva et al. |
| 6,666,687 | B2 | 12/2003 | Stuppy |
| 6,675,133 | B2 | 1/2004 | Knowles et al. |
| 6,688,889 | B2 | 2/2004 | Wallace et al. |
| 6,704,741 | B1 | 3/2004 | Lively, Jr. et al. |
| 6,877,989 | B2 | 4/2005 | Embretson |
| 6,918,772 | B2 | 7/2005 | Clark et al. |
| 6,978,115 | B2 | 12/2005 | Whitehurst et al. |
| 6,996,366 | B2 | 2/2006 | L'Allier et al. |
| 7,121,830 | B1 | 10/2006 | Kaplan et al. |
| 7,127,208 | B2 | 10/2006 | Burstein et al. |
| 7,137,821 | B2 | 11/2006 | Jorgensen et al. |
| 7,162,198 | B2 | 1/2007 | Kuntz et al. |
| 7,165,012 | B2 | 1/2007 | Swanson |
| 2002/0028430 | A1 | 3/2002 | Driscoll et al. |
| 2002/0182579 | A1 | 12/2002 | Driscoll et al. |
| 2002/0188583 | A1 | 12/2002 | Rukavina et al. |
| 2003/0017442 | A1 | 1/2003 | Tudor et al. |
| 2003/0118978 | A1 | 6/2003 | L'Allier et al. |
| 2003/0129575 | A1 | 7/2003 | L'Allier et al. |
| 2003/0129576 | A1 * | 7/2003 | Wood et al. .................. 434/362 |
| 2003/0152902 | A1 * | 8/2003 | Altenhofen et al. .......... 434/350 |
| 2003/0180703 | A1 | 9/2003 | Yates et al. |
| 2003/0198932 | A1 | 10/2003 | Stuppy |
| 2003/0200077 | A1 | 10/2003 | Leacock et al. |
| 2004/0063085 | A1 * | 4/2004 | Ivanir et al. .................. 434/322 |
| 2004/0076941 | A1 | 4/2004 | Cunningham et al. |
| 2004/0086841 | A1 | 5/2004 | Clark et al. |
| 2004/0106088 | A1 | 6/2004 | Driscoll et al. |
| 2004/0229199 | A1 | 11/2004 | Ashley et al. |
| 2005/0079477 | A1 * | 4/2005 | Diesel et al. .................. 434/350 |
| 2005/0086257 | A1 | 4/2005 | Wright |
| 2005/0255439 | A1 | 11/2005 | Cody |
| 2006/0078864 | A1 | 4/2006 | Jorgensen et al. |
| 2006/0160057 | A1 | 7/2006 | Armagost et al. |
| 2006/0188862 | A1 | 8/2006 | Johnson |

OTHER PUBLICATIONS

Embretson, Susan E., "A Multidimensional Latent Trait Model for Measuring Learning and Change", Psychometrika, vol. 56, No. 3, pp. 495-515; Sep. 1991.

Helm, L., Los Angeles Times, "The future of software may lie in the obscure theories of an 18th century cleric named Thomas Bayes", 4 pages, Oct. 28, 1996, http://www.cs.berkeley.edu/~murphyk/Bayes/la.times.html.

Statestandards.Com, "California Star Standards Test Blueprints", (2003), 1 page, May 11, 2004.

American Association for the Advancement of Science Literacy, "Laws of Motion", pp. 62-63, 2001.

Gong, Brian et al., "Instructional Assessments: Lever for Systemic Change in Science Education Classrooms", Journal of Science Education and Technology, vol. 1, No. 3, pp. 157-176, 1992.

Mioduser, David et al., "The Weather Lab: An Instruction-Based Assessment Tool Built From a Knowledge-Based System", Journal of Computers in Mathematics and Science Teaching, vol. 17, No. 2/3, pp. 239-263, 1998.

Bunderson et al., "The Four Generations of Computerized Educational Measurement", In Educational Measurement ($3^{rd}$ Ed.), pp. 387-398, 1989.

Pellegrino, James W. et al. "Knowing What Students Know: The Science and Design of Educational Assessment", The National Academies Press, pp. 175-189; 200-206.

Henze, Nicola et al., "Student Modeling in an Active Learning Environment Using Bayesian Networks", Proceedings of the $7^{th}$ International Conference on User Modeling, UM99 (Banff, CA, 1977), pp. 1-10.

Gagné, R.M. Learning Hierarchies[3]: Chapter 2, pp. 63-84 (1968).

* cited by examiner

800

| System 100's Performance Indicators | Label | /802 |
|---|---|---|
| PI-1, DOK=4 | Earth is shaped like a ball | |
| PI-2, DOK=1 | Earth Spins around an Axis | |
| ... | ... | |
| PI-N, DOK=2 | Earth completes a rotation every 24 hours | |

| Textbook X's Performance Indicators | Label | /804 |
|---|---|---|
| PI-1, DOK=4 | Earth is shaped like a ball | |
| PI-2, DOK=1 | Sun does not move around the earth | |
| ... | ... | |
| PI-J, DOK=2 | Earth rotates | |

| State A's Performance Indicators | Label | /806 |
|---|---|---|
| PI-1, DOK=1 | Earth is one of several planets | |
| PI-2, DOK=2 | All planets orbit the sun | |
| ... | ... | |
| PI-K, DOK=4 | Sunlight can be blocked to create shadows | |

/810

| System 100's Performance Indicators | State A's Performance Indicators | Textbook X's Performance Indicators |
|---|---|---|
| PI-1 | PI-7 | PI-1 |
| PI-2 | | PI-3 |
| PI-3 | PI-1 | PI-5 |
| ... | ... | ... |
| PI-N | PI-52 | PI-12 |

| CTB frameworks | File | Edit | View | Tasks | Window | Help |

Define Search > Standards Alignment > Indicator Alignment > Test Definition > Item Review

Content Area (902): Science ▼

Educational Level (904): ☑ Elementary ☐ Middle School ☐ High School

Select State (906): California ▼

Select Textbook (908): None ▼

Elements of Display (910): ☑ CTB Frameworks ☑ State Frameworks ☐ Textbook

View matches for viewpoint of: (912) ⦿ CTB Standards ○ State Standards ○ Textbook (914) [Show Data] [Clear Choices]

CTB Standard - Elementary School Science (921)
Earth and Space
Standard: 3.1 Day/Night Cycle

California - Elementary School Science (922)
Matches found in 3rd Grade Science
Focus on Earth Science and Physical Science
Standard: Various

| Performance Indicators | Depth Levels (920) | Performance Indicators |
|---|---|---|
| 3.1.9 Earth completes a rotation every 24 hours | 1,2,3,4 | |
| 3.1.8 Shadows change length and direction | 1,2,3,4 | 1 — Physical Science:2a. Students know sunlight can be blocked to create shadows. |
| 3.1.7 Sunrise/Sunset are positions in Earth's rotation | 1,2,3 | 1 — 4e. Students know the position of the Sun in the sky changes during the course of the day and from season to season. |
| 3.1.6 Time Zone is dependent on E/W position on Earth | 1,2,3,4 | |
| 3.1.5 Day and night are the result of Earth's rotation | 1,2,3 | |
| 3.1.4 At night the sun shines on the other side of Earth | 1,2 | |
| 3.1.3 The sun does not move around Earth | 1,2 | 4d. Students know that Earth is one of several planets that orbit the Sun and that the Moon orbits Earth. |
| 3.1.2 Earth spins around an axis (like a top) | 1,2 | |
| 3.1.1 Earth is shaped like a ball | 1,2 | |

900

| CTB frameworks | File | Edit | View | Tasks | Window | Help | | |
|---|---|---|---|---|---|---|---|---|

Reports > Science > Earth and Space Science > Solar System > Day Night Cycle

Select Report Type
○ Student Indicators
◉ Class Indicators
○ School Indicators
○ Other

Report Type: Student Indicator Report
District: Elmwood
School: Elmwood Elementary School
Class: Julian Hamilton's 3rd Grade ▨ % Students Know Indicator
☐ % Students Unclear if Know Indicator
▧ % Students Do NOT Know Indicator
░ N/A (not tested or not applicable)

Click an indicator to select that topic. Double click bar graph to get student details for that indicator.

| Indicators | Routine | Comprehension | Application | Exploration |
|---|---|---|---|---|
| Earth completes a rotation every 24 hours | | | | |
| Shadows change length and direction | | | | |
| Sunrise/Sunset are positions in Earth's rotation | | | | |
| Time Zone is dependant on E/W position on Earth | | | | |
| Day and night are the result of Earth's rotation | | | | |
| At night the sun shines on the other side of Earth | | | | |
| The sun does not move around Earth | | | | |
| Earth spins around an axis (like a top) | | | | |
| Earth is shaped like a ball | | | | |

POST-CURSOR / PRE-CURSOR

Select School
Elmwood Elem... ▼

Select Teacher
Julian Hamilton ▼

Select Class
3rd Grade ▼

Select Student
N/A ▼

[ Print ]
[ Publish to Web ]

| First Name | Last Name | Indicator | 1 | 2 | 3 | 4 |
|---|---|---|---|---|---|---|
| Alecia | Sanchez | 100% | ◯ | ◯ | ◯ | ◯ |
| Bernice | Hanson | 100% | ◯ | ◯ | ◯ | ◯ |
| Carlos | Putterman | 75% | ◯ | ◯ | ◯ | ◯ |
| Geeta | Chandola | 100% | ◯ | ◯ | ◯ | ◯ |
| Ivan | Zuckerman | 50% | ◯ | ◯ | ◯ | ◯ |
| John | Doe | 100% | ◯ | ◯ | ◯ | ◯ |
| Kelly | Quiroz | 0% | ◯ | ◯ | ◯ | ◯ |
| Maurice | Morris | 25% | ◯ | ◯ | ◯ | ◯ |

CTB: Student Details for "The sun does not move around...

CTB: Student Grouping for Target Indicator "Day and night are the result of earth's rotation"

Select Criteria for Grouping
- ◉ Similar Knowledge
- ○ Complementary Knowledge

Select Number of Groups: 3 ▶

| Group | Students |  |  | Pre-cursors |  |  |  | Target | Post-cursors |  |  |  |
|---|---|---|---|---|---|---|---|---|---|---|---|---|
|  | First Name | Last Name | Overall | 1 | 2 | 3 | 4 | 0 | 1 | 2 | 3 | 4 |
| 1 | Alecia | Sanchez | 95% | ⊘ | ⊘ | ⊘ | ⊘ | ⊘ | ⊘ | ⊘ | ⊘ | ○ |
| 1 | Bernice | Hanson | 90% | ⊘ | ⊘ | ⊘ | ⊘ | ⊘ | ⊘ | ⊘ | ⊘ | ○ |
| 1 | Geeta | Chandola | 95% | ⊘ | ⊘ | ⊘ | ⊘ | ⊘ | ⊘ | ⊘ | ⊘ | ○ |
| 1 | John | Doe | 87% | ⊘ | ⊘ | ⊘ | ○ | ○ | ⊘ | ⊘ | ⊘ | ○ |
| 2 | Ivan | Zuckerman | 65% | ⊘ | ⊘ | ⊘ | ○ | ⊘ | ⊘ | ⊘ | ⊘ | ○ |
| 2 | Carlos | Putterman | 55% | ⊘ | ○ | ⊘ | ○ | ⊘ | ⊘ | ⊘ | ⊘ | ○ |
| 2 | Kelly | Quiroz | 37% | ⊘ | ⊘ | ○ | ○ | ⊘ | ⊘ | ⊘ | ⊘ | ○ |
| 2 | Maurice | Morris | 10% | ○ | ⊘ | ○ | ○ | ⊘ | ⊘ | ⊘ | ⊘ | ○ |

Legend:
- ⊘ Knows Indicator
- ○ No Information
- ⊘ Does Not Know Indicator

John Doe's Response:
Partially Incorrect

Check each sentence that is true.

- ☒ The Sun moves around Earth once each day.
- ☐ When it is night in your town, the Sun is still shining on part of Earth.
- ☒ Sunrise happens everywhere at once
- ☐ If Earth stopped spinning the sun would rise only once each year
- ☐ If a the shadow of a flagpole points east in the morning then it will point west in the afternoon.
- ☐ Day and night happen because Earth rotates.
- ☒ The Moon and Earth have the same shape.
- ☒ Earth spins around like a top
- ☒ Earth moves around the Sun once each day

*Green: correctly answered*

*Pink: incorrectly answered*

John Doe's Response:
Incorrect

What causes day and night?

- (A) Earth moves around the Sun once each day, making it light during the day and dark at night.
- B. The Moon moves around Earth once each day, making it light during the day and dark at night.
- C. The Sun moves around Earth once each day, making it light during the day and dark at night.
- D. The clouds make the sky dark at night. The clouds are gone during the day.
- E. The Moon in the sky makes it night. When the Moon goes away day comes.
- F. The Sun comes up out of the mountains in the morning and goes behind them at night
- G. The Sun comes up from behind the mountains in the morning and then goes down into the ocean at night.
- H. The Sun comes up from the ocean each morning and goes down behind the mountains each night
- I. The Sun gets closer to the earth during the day. At night the Sun moves far away.
- J. Earth spins around once each day. It is day on the side of Earth facing the Sun, and night on the side of Earth facing away from the Sun.
- K. Earth rotating back and forth. It is day when Earth is facing the Sun, and night when Earth is facing away from the Sun.

FIGURE 27

SYSTEM AND METHOD FOR THE DEVELOPMENT OF INSTRUCTIONAL AND TESTING MATERIALS

This application claims the benefit of U.S. Provisional Patent Application No. 60/404,394, filed on Aug. 20, 2002, the contents of which are hereby incorporated herein by reference.

This application is related to U.S. Provisional Patent Application No. 60/449,827, filed on Feb. 26, 2003 and U.S. Provisional Patent Application No. 60/447,300, filed on Feb. 14, 2003. The contents of both of these provisional patent applications is hereby incorporated herein by reference.

BACKGROUND OF THE INVENTION

The present invention relates to a system that supports (1) the development and administration of instructional materials and/or programs, (2) the development, administration, scoring and reporting of testing materials and/or programs, and/or (3) the integration of instruction materials with test materials and/or programs.

SUMMARY OF THE INVENTION

Aspects of the present invention provide a system that supports (1) the development and administration of instructional materials and/or programs, (2) the development, administration, scoring, and reporting of assessment materials (e.g. formative, diagnostic summative, etc.) and/or programs, and/or (3) the integration of instruction with assessment materials and/or programs. The system achieves this by organizing the content (knowledge taught and assessed) in these materials and programs into learning targets and ordering the learning targets to reflect the pre-cursor/post-cursor relationships among the learning targets. Learning targets are the correct conceptions or misconceptions that are part of any learning path, decomposed into the smallest units that are useful for educational purposes, and further decomposed and defined by the level of expertise with which these units are understood and applied.

As used herein a "target indicator" corresponds to a learning target to be taught or assessed. Pre-cursor indicators are related to the knowledge that the student should have prior to being taught the target (target indicator). Post-cursor indicators relate to knowledge that the student should be able to acquire more readily after learning the target (target indicator).

Advantageously, in some embodiments, the system links each defined learning target with other entities associated with the learning target (these entities may include but are not limited to any or all of the following: items or parts of items, item statistics, instructional materials, research on misconceptions, teaching strategies, time-to-learn data, data associated with special populations, matching content descriptions and/or location in any other curriculum, instruction, assessment taxonomy or framework, etc.).

Further, the system may employ a data model and methods that permit access to the learning targets, learning target ordering, linked entities, and learning sequence information for efficient use in: the development and administration of instructional materials and/or programs; and/or the development, administration, scoring, and reporting of assessment materials and/or programs; and/or the integration of instructional and assessment materials.

Additionally, the system may provide recommendations as to collections of learning targets and/or collections of linked entities for specific purposes based on user preferences or circumstances.

In one particular aspect, the present invention provides a system for designing academic achievement tests using a database of test items and software that (i) allows a user to select a major academic area (e.g., science) and a topic or growth strand (e.g., laws of motion) within that academic area, (ii) retrieves tests items from the database that relate to that growth strand, and (iii) displays the test items within a matrix having rows representing learning targets (e.g., pre-cursor indicators, target indicators, and post-cursor indicators) and columns representing depth of knowledge (e.g., routine, comprehension, application, exploration). One or more test items can be displayed within a cell of the matrix depending upon the learning target and depth of knowledge they demonstrate.

The system can be set to display items from a recommended test, a previously defined test, or all relevant test items within the database that relate to the selected target and its pre-cursors and post-cursors. The user can add or remove test items by clicking on individual test items. The user can also view test items by double clicking on individual test items. The test definition can be saved once the user has completed the process of selecting test items for the test.

Another aspect of the system allows the user to see how a state's or textbook's performance indicators defined within a selected content area (e.g., science) at a selected education level (e.g., elementary) map onto the system's performance indicators defined within the selected content area at the selected education level, and vice-versa.

Advantageously, the system further may be configured to enable the user to view performance reports, test items, and students' responses to a set of test items.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

FIG. 8 illustrates information that may be stored in and used by the system.

FIG. 9 illustrates an example user interface screen for displaying performance indicator alignments between the system's performance indicator and other performance indicators.

FIG. 11 illustrates a user interface for displaying reports.

FIG. 12 illustrates a student details user interface.

FIG. 13 illustrates the interface displayed to the user after the user has selected to view a report for a selected individual student.

FIG. 14 illustrates a Student Grouping for Target Indicator Screen.

FIGS. 15-30 illustrate user interface screens that are used for displaying the items of a test.

DETAILED DESCRIPTION OF THE PREFERRED EMBODIMENT

In one aspect, the present invention provides a system 100 (see FIG. 1) for enabling a user of the system to, among other things, create a knowledge assessment (i.e., a test).

I. System Overview

Figure 1:
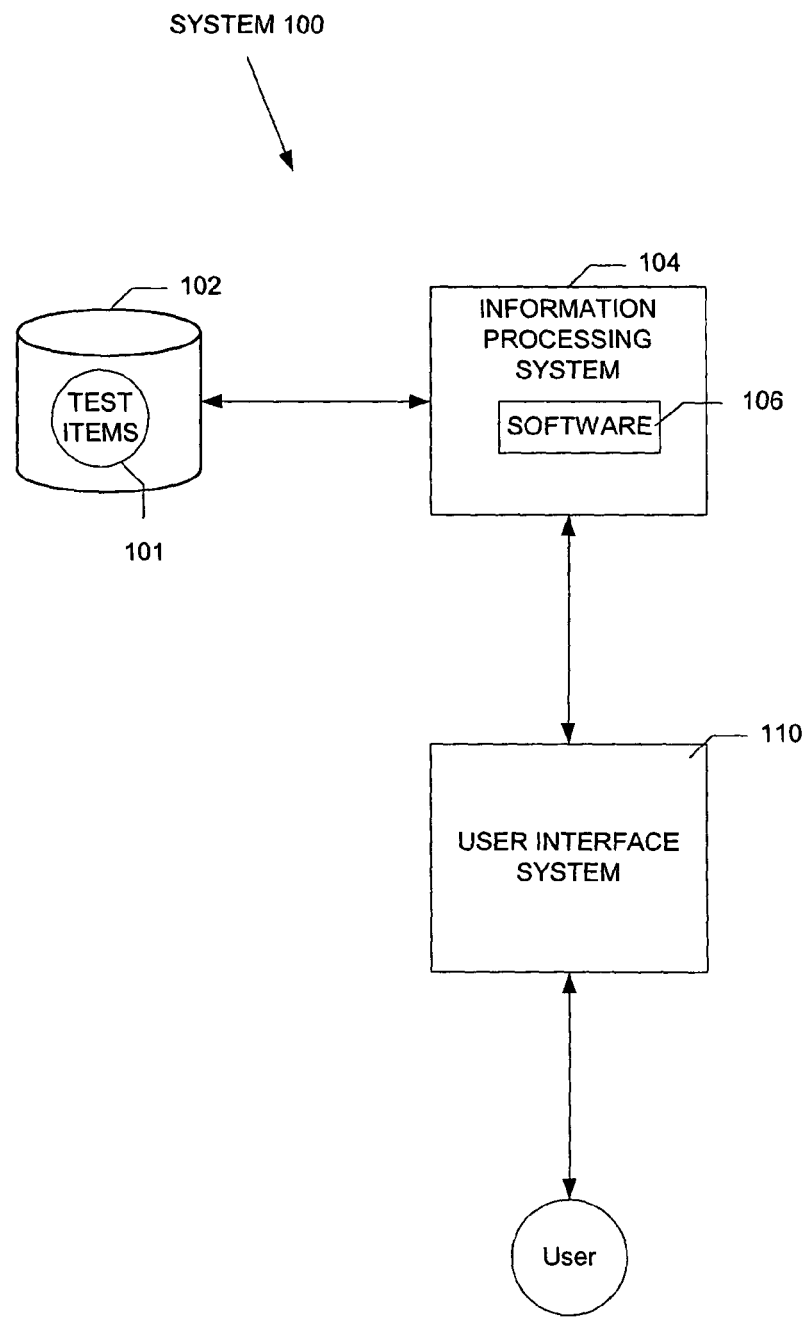
FIG. 1 is a functional block diagram of a system according to one embodiment of the invention.

As shown in FIG. 1, system 100 includes a set of stored test items 101 (also referred to as item bank 101). In one embodiment, a test item is an assessment unit, usually a problem or question. A test item can be a selected response item, constructed response item, essay response item, performance assessment task, or any other device for gathering assessment information. Test items can be delivered and or scored via a manual process or via electronic process. Preferably, the test items 101 are stored in a database 102.

System 100 also includes an information processing system 104 having software 106 stored therein and/or accessible thereto. Information processing system 104 may include one or more general and/or special purpose computers. If more than one computer is used to implement processing system 104, the two or more computers need not be co-located. If they are not co-located, then, preferably, a network (e.g., the Internet or other network) is used to enable the two or more computers to communicate with each other.

Software 106 may include one or more computer programs (e.g., web servers, web browsers and other computer programs), scripts, markup language documents (e.g., HTML, XML, etc.), routines, and/or other mechanism for controlling processing system 104 and/or user interface 110.

Coupled to processing system 104 is a user interface system 110. User interface system 110 may be directly connected to processing system 104 or indirectly coupled to the processing system 104 through, for example, a local or wide area network. User interface system 110 may include one or more information input and/or output device, such as, for example, a monitor, keyboard, mouse, microphone, speaker or other information input/output device.

II. Organization of the Item Bank

Referring back to item bank 101, the items within item bank 101 are subdivided into major academic content areas, for example, science, math, and geography. This is illustrated in FIG. 2.

Figure 2:
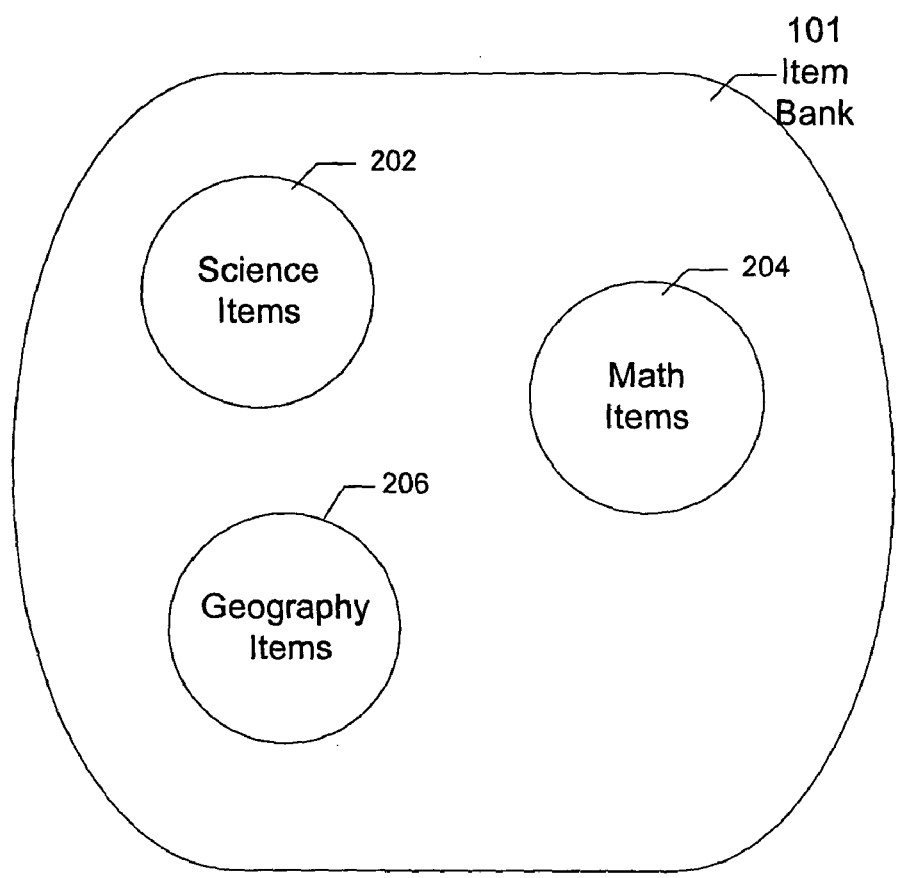
FIG. 2 illustrates the item bank being subdivided into content areas.

As shown in FIG. 2, item bank 101 may include a set of science test items 202, a set of math test items 204, and a set of geography test items 206. Each content area (e.g., science) may further be subdivided into growth strands.

Figure 3:
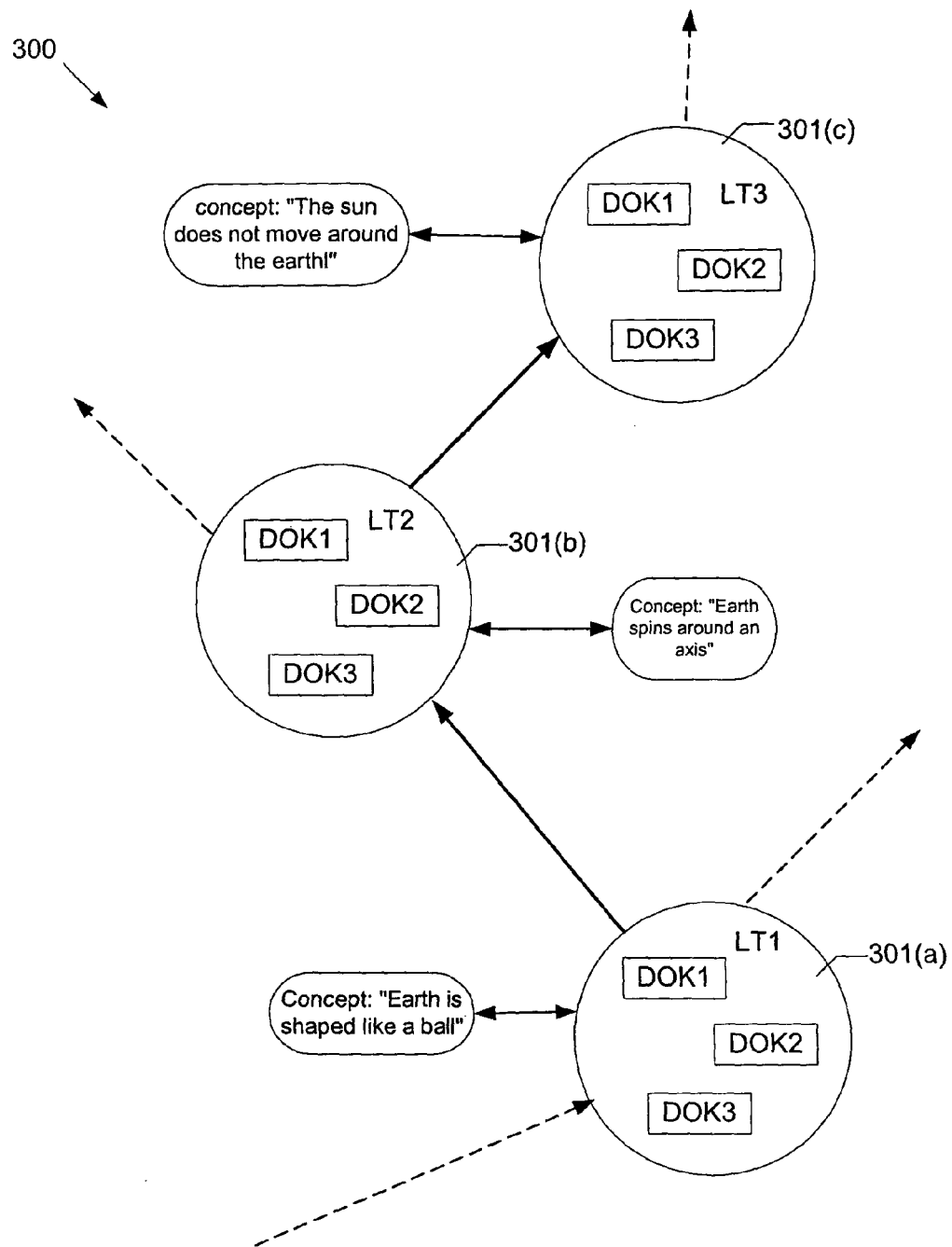
FIG. 3 illustrates a set of interconnected learning targets (LTs).

FIG. 3 illustrates an example growth strand 300 within the science content area. Growth strand 300 is referred to as the "day/night cycle" growth strand because it relates to the concept of the earth's day and night cycles. Growth strands comprise one or more learning targets (LT). Thus, each content area is associated with a set of LTs. As shown in FIG. 3, growth strand 300 includes learning targets 301(*a*)-301(*c*). Learning targets are also referred to herein as "indicators" or "performance indicators."

Each learning target (LT) 301 has one or more depths of knowledge (DOK) associated therewith.

For example, learning target 301(*a*), which is labeled "earth is shaped like a ball," has three depths of knowledge: DOK1 (a.k.a., "routine"), DOK2 (a.k.a., "comprehension") and DOK3 (a.k.a., "application"). Similarly, LT2 301(*b*) also has three depths of knowledge. Advantageously, each DOK associated with a learning target (LT) is also associated with one or more items within item bank 101. This is illustrated in FIG. 4.

Figure 4:
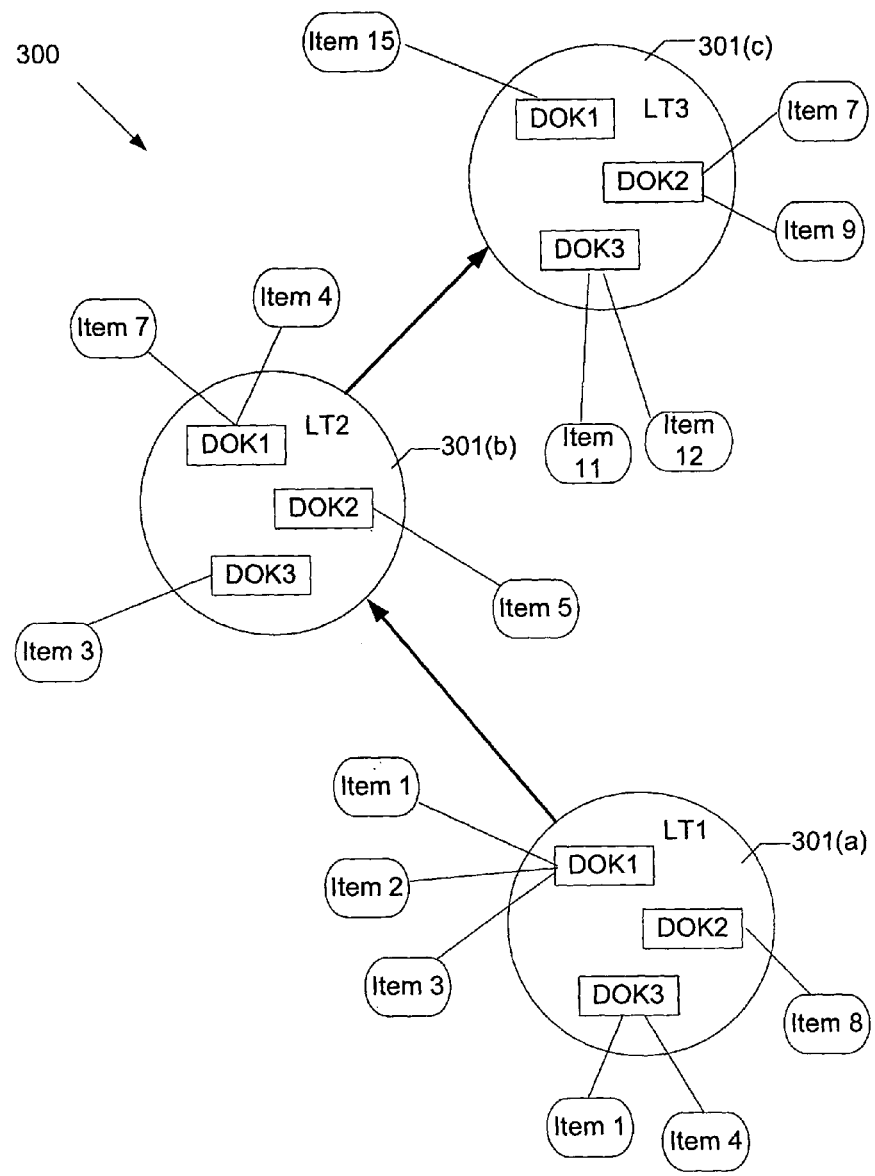
FIG. 4 illustrates items being associated with learning target/depth of knowledge (TOC/DOK) pairs.

As shown in FIG. 4, DOK1 of LT1 is associated with the following items: items1-3. Similarly, DOK2 of LT2 is as associated with item7 and item9. The other LT/DOK pairs are also associated with one or more items. This relationship between LT/DOK pairs and items within item bank 101 may be stored in a database, such as database 102.

Additionally, information relating to pre-cursor and post-cursor relationship between LTs may also be stored in a database. As shown in FIG. 3, a LT may be connected to at least one other LT by a directed arc. A connection between two LTs signifies a pre-cursor or post-cursor relationship, depending on the direction of the arc that connects the two LTs. For example, from FIG. 3 we know that LT2 is a pre-cursor to LT3 because the directed arc that connects LT2 to LT3 begins at LT2 and ends at LT3. Similarly, it is evident that LT2 is a post-cursor to LT1 because the directed arc that connects LT1 to LT2 begins at LT1 and ends at LT2.

III. System Recommended Tests

As discussed above, each content area (e.g., science) includes a set of pre-defined learning targets, which may be grouped into growth strands, as shown in FIGS. 3 and 4. Preferably, system 100 stores in a database a set of one or more recommended tests for each pre-defined learning target. This set of recommended tests may include: recommended unit tests, recommended pre-tests, and recommend post-tests. This feature of system 100 is illustrated in FIG. 5.

Figure 5:
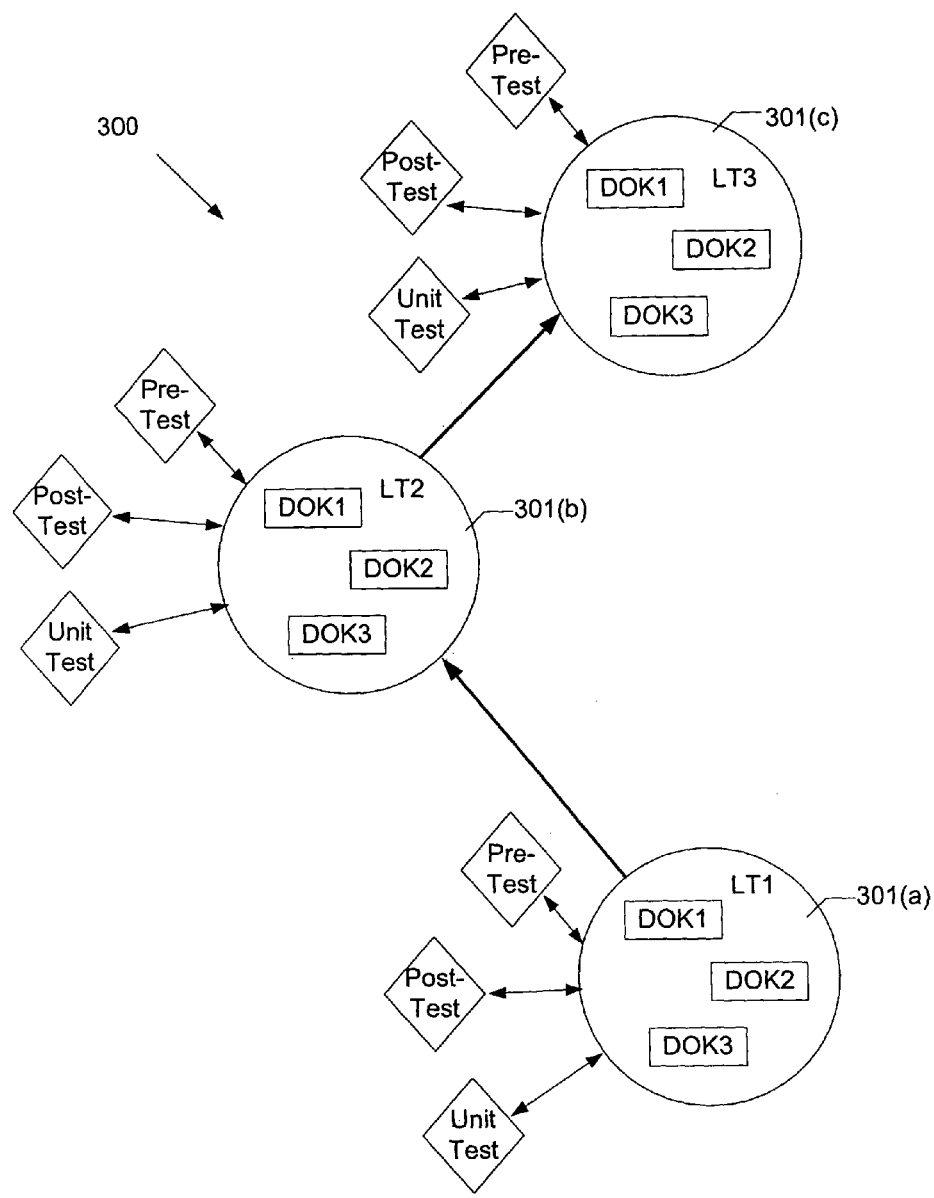
FIG. 5 illustrates recommended tests being associated with learning targets.

FIG. 5 shows the growth strand depicted in FIG. 3 and shows each learning target 301(*a*)-(*c*) being associated with a set of recommended tests (i.e., a recommended unit test, a recommended pre-test, and a recommended post-test). Each recommended test associated with a learning target includes one or more test items from item bank 101.

In addition to associating items and tests with a learning target, the system 100 can associate other entities with a learning target by storing entity information in a database and associating that information with the learning target. Such other entities may include: items parts, instructional material, item statistics, research on misconceptions, teaching strategies, time-to-learn data, data associated with special populations, matching content descriptions and/or location in any other curriculum, instruction, assessment taxonomy or framework, etc.

IV. Selecting, Modifying and Creating Tests

Figure 6:
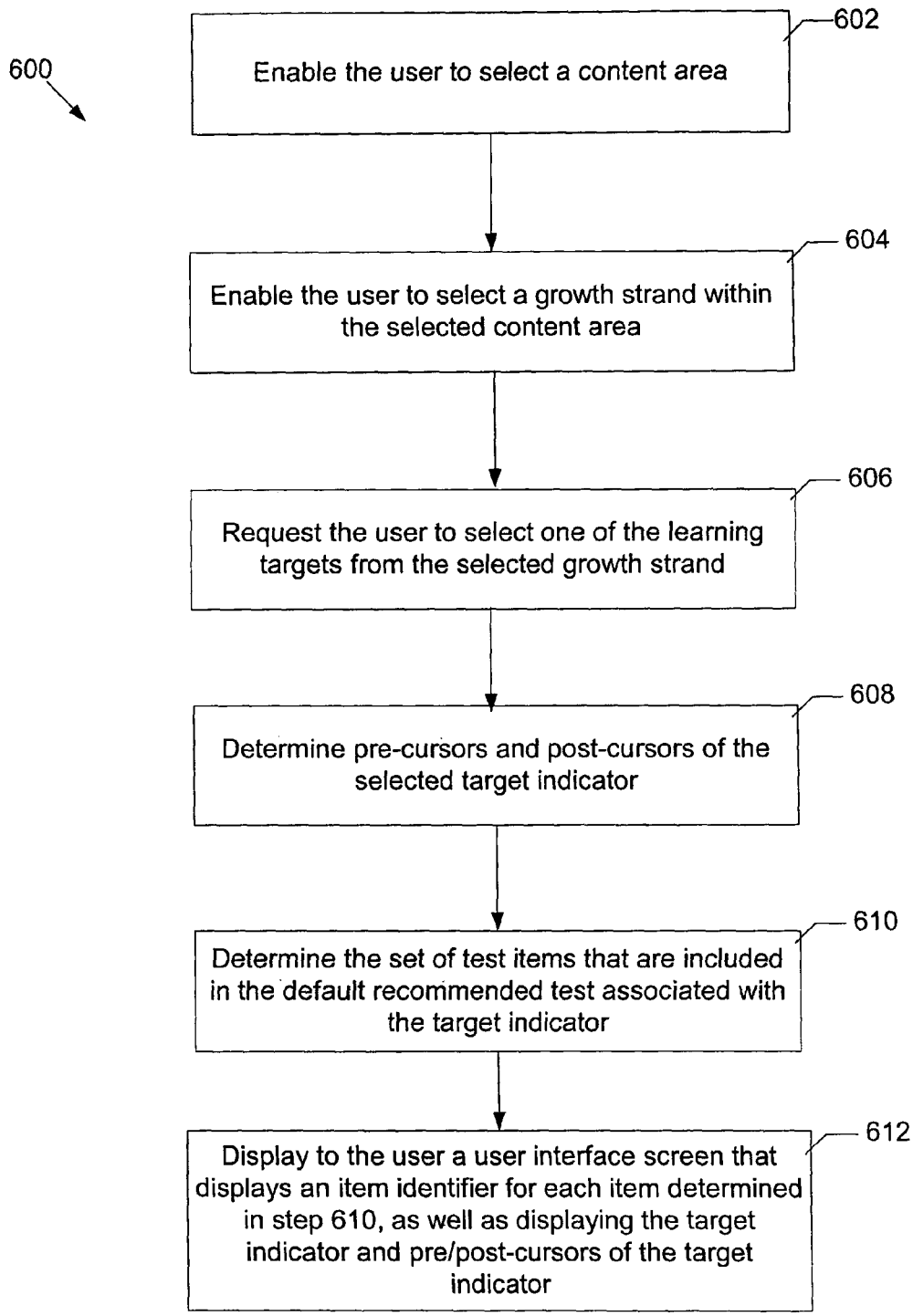
FIG. 6 is a flow chart illustrating a process according to one embodiment of the invention.

Software 106 of system 100 enables a user to select, modify and create academic achievement tests. FIG. 6 is a flow chart illustrating a process 600 that may be performed by software 106. Although process 600 is depicted as an ordered sequence of steps, the steps need not necessarily be performed in the order shown. Moreover, it is contemplated that steps may be added to and/or deleted from process 600.

Process 600 may begin in step 602. In step 602, software 106 enables the user to select a content area (e.g., science). For example, software 106 may display a list of the available content areas and allow the user to select one of the content areas from the list. In step 604, software 106 enables the user to select a growth strand within the selected content area. In step 606, after the user selects a growth strand, software 106 request the user to select one of the learning targets from the selected growth strand. The selected learning target is referred to as the target indicator.

After the user selects a target indicator, software 106 determines pre-cursors and post-cursors of the selected target indicator (step 608). As discussed above, this information may be contained in a database, in which case, software 106 may access the database to determine pre-cursors and post-cursors of the selected target.

Next (step 610), software 106 determines the set of test items that are included in the default recommended test associated with the target indicator. This information may also be contained in a database, in which case, software 106 may access the database to determine which of the recommended tests is the default and the items that are included in the default recommended test.

Any one of the recommended tests associated with the target indicator may be the default recommended test. In one embodiment, the recommended pre-test is the default recommended test. Thus, in this embodiment, in step 610, software 106 determines all of the test items that are included in the recommended pre-test associated with the target indicator.

Next (step 612), software 106 displays to the user a user interface screen that displays an item identifier for each item determined in step 610, as well as displaying the target indicator and pre/post-cursors of the target indicator. Preferably, the item identifiers are presented to the user in an organized fashion that makes it easy for the user to quickly determine the LT/DOK pair with which any particular item from the recommended test is associated.

Figure 7:
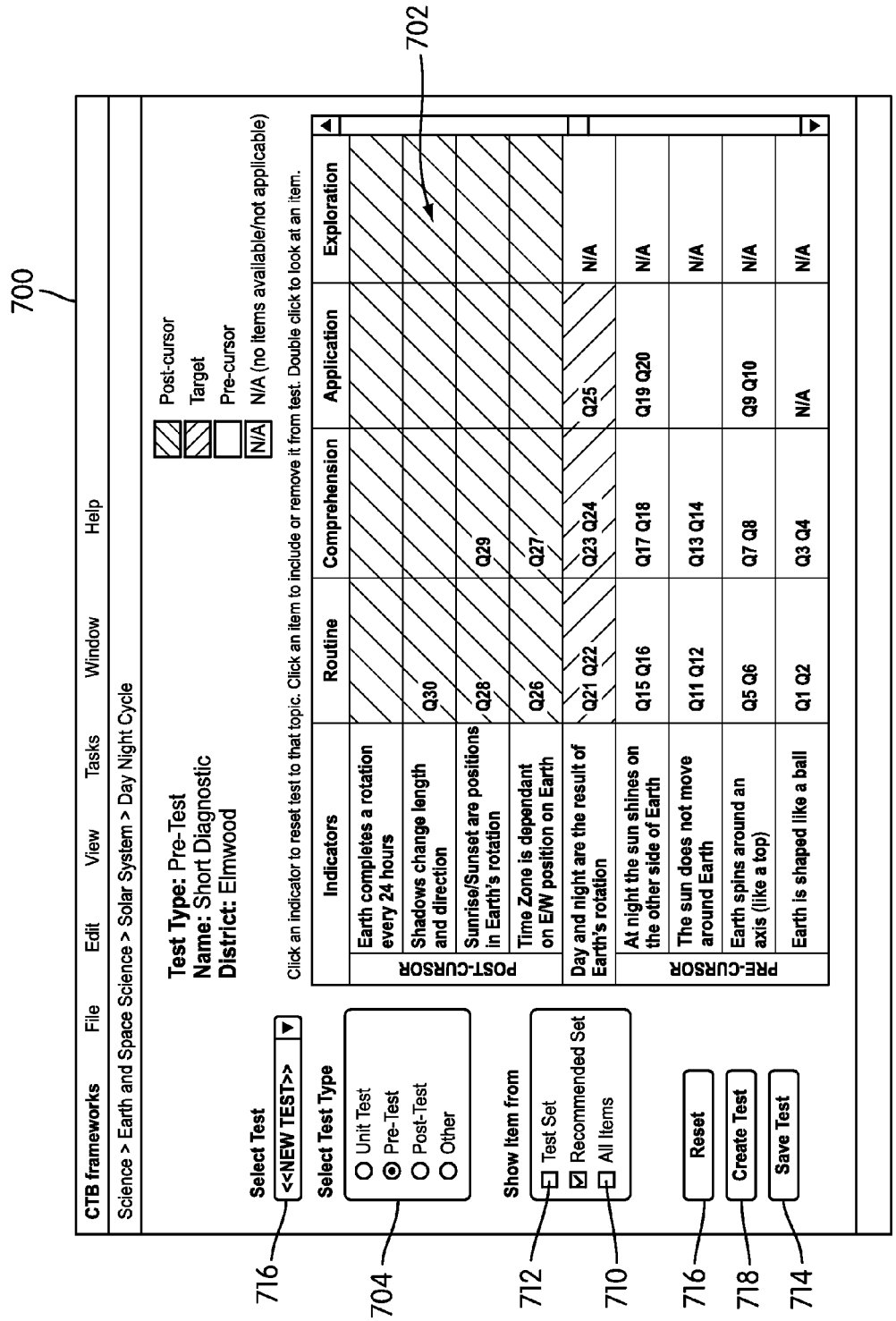
FIG. 7 illustrates an example user interface screen.

In one embodiment, software 106 displays the item identifiers in table form. FIG. 7 illustrates an example of a user interface screen 700 that is displayed by software 106 in step 612. As shown in FIG. 7, user interface screen 700 includes a table 702 (a.k.a., item selection matrix 702) for presenting the items included in the default recommended test. As shown in FIG. 7, the items are presented to the user in an organized fashion that makes it easy for the user to determine the LT/DOK pair with which any particular item is associated.

Each row of table 702 corresponds to one of the target indicator, a pre-cursor, or a post-cursor. In the example shown in FIG. 7, the middle row corresponds to the target indicator, the rows above the middle row correspond to post-cursors of the target indicator, and the rows below the middle row correspond to pre-cursors of the target indicator.

Each column of table 702 corresponds to a different depth of knowledge. In the example shown in FIG. 7, there are four columns, one for each of the following four different depths of knowledge: routine, comprehension, application, and exploration. The item identifiers for the items determined in step 610 are displayed in the appropriate row/column location. That is, each item identifier is positioned in one more cells of the table based on the LT/DOK pair with which the item identified by the identifier is associated.

For example, if one of the items determined in step 610 is associated with one particular LT/DOK pair, then the identifier for the item will be included in the cell of table 702 that is in the row corresponding to the LT and the column corresponding to the DOK. Thus, a user of system 100 can quickly and easily determine the LT/DOK pair with which an item is associated. For example, simply by reviewing table 702, it is clear that item Q25 is associated with the target indicator at the "application" depth of knowledge (DOK). As another example, it should be clear that items Q1 and Q2 are associated with the "earth is shaped like a ball" LT and the "Routine" DOK.

Preferably, the row of the matrix containing the target indicator has a different background color than the other rows in the matrix. Similarly, it is preferably that the rows associated with the pre-cursors and the rows associated with the post-cursors have unique colors. For example, the post-cursor row(s) could be colored blue, the target indicator row could be colored yellow, and the pre-cursor row(s) could be colored red. In this manner, a user can more easily distinguish among the target indicator, post-cursors, and pre-cursors.

In addition to including table 702, user interface screen 700 may include buttons, checkboxes and the like for enabling the user to change what is displayed in table 702. For example, screen 700 includes radio-buttons 704 that enable the user to select a different test type than the one currently being displayed. If, for example, the user selects the button associated with "Unit Test," then software 106 will display in table 702 the item identifiers that identify the items included in the recommended Unit Test. Similarly, if the user selects the button associated with "Pre-Test," then software 106 will display in table 702 the items that are included in the recommended Pre-Test. In this manner, the user can review the items that make up the recommended Unit Test, recommended Pre-Test and recommended Post-Test.

Screen 700 may also enable the user to view all items associated with the currently displayed target indicator, pre-cursor indicator and post-cursor indicator. Additionally, screen 700 may enable the user to view any previously defined test.

To view all items associated with the currently displayed target indicator, pre-cursor indicators and post-cursor indicators, the user need only click on the "All items" button 710. In response to the user clicking on button 710, software 106 determines all of the items associated with the target indicator and each pre-cursor and post-cursor indicator displayed on screen 700. As discussed above, a database may be used to store information that enables software 106 to make this determination. After determining the items associated with the target indicator and each pre-cursor and post-cursor indicator, software 106 displays in the appropriate cells of table 702 the identifiers that identify the determined items. Thus, an identifier that identifies an item associated with a particular TOC/DOK pair will be positioned in the cell of table 702 that corresponds to the particular TOC/DOK pair.

To view the items associated with a previously defined test, the user need only click on the "Test Set" button 712 and select the previously defined test using pull-down menu 716. In response to the user clicking on button 712 and selecting a previously defined test, software 106 determines all of the items associated with the previously defined test. A database may be used to store information that enables software 106 to make this determination. After determining the items associated with the selected previously defined test, software 106 displays in the appropriate cells of table 702 the identifiers that identify the determined items.

Advantageously, in at least one embodiment, software 106 enables the user to modify an existing test and save the modified test. To modify an existing test (e.g., the recommended Unit Test or a previously defined test), the user first selects the test and then adds and/or removes item identifiers from table 702. Once the user is finished modifying the test, the user can click on the "Save Test" button 714 to save the modified test.

Clicking on the "Reset" button 716 causes software 106 to put table 702 back into the state it was before the user began modifying the test. The user can also create a test from scratch by clicking on the "Create Test" button 718 and then adding item identifiers to table 702.

Additionally, software 106 provides a user with easy access to view individual items in the selected test by simply clicking on the identifier of the item the user desires to view.

In response to the user clicking on an item identifier, software 106 displays to the user the item associated with the clicked on identifier. For example, if the user double-clicks on item identifier "Q21," then software 106 displays an item view screen 3100 (see FIG. 31).

Figure 31:
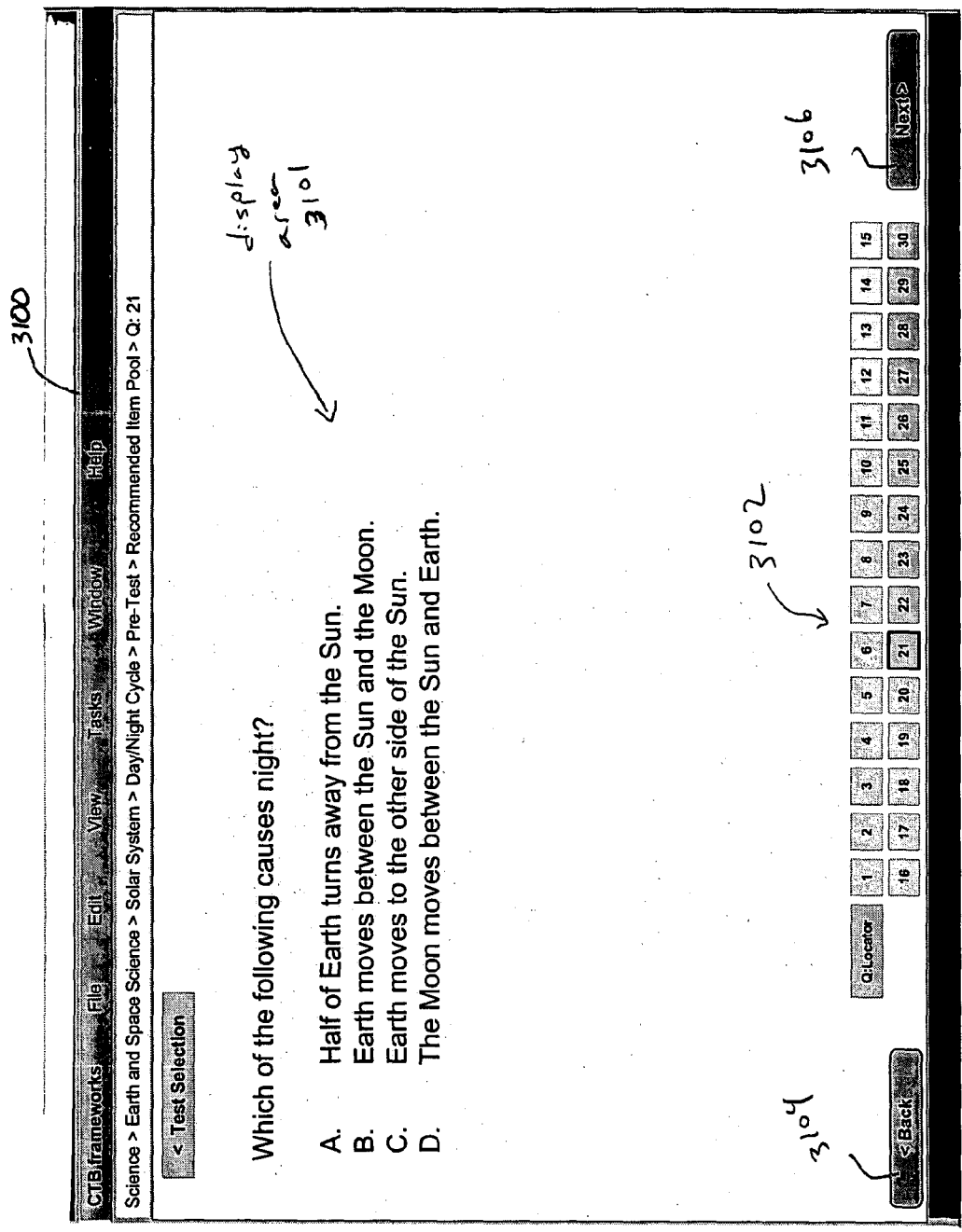
FIG. 31 illustrates an item view screen.

As shown in FIG. 31, item view screen 3100 displays in a display area 3101 the item associated with item identifier "Q21." Screen 3100 also includes a navigation bar 3102 that includes set of buttons. Each button within navigation bar 3102 is associated with an item. To view an item associated with a button, the user need only click on the button. Screen 3100 further includes a next button 3106 and a back button 3104 for viewing the next and the previous items, respectively.

Indicator and depth of knowledge for each item may be shown as a tool tip on mouse over for each item number in the navigation bar 3102. Similarly, the items listed at navigation bar 3102 can be color-coded to identify the LT/DOK pair with which the item is associated. For example, the buttons in navigation bar 3102 associated with items 1-20 may have one color (e.g., blue), thereby identifying items 1-20 as pre-cursor items, the buttons in navigation bar 3102 associated with items 21-25 may have another color (e.g., gold), thereby identifying items 21-25 as target items, and the buttons in navigation bar 3102 associated with items 26-30 may be still another color (e.g., purple), thereby identifying the items 26-30 as post-cursor items.

V. The Standards Alignment Matrix

Another feature of system 100 is that it enables the user to analyze an alignment between any set of curriculum standards, or instructional materials, with tests designed to assess achievement of these standards or measure learning progress in the instructional materials. This capability is based on prior cross-coding of all the materials/publications/frameworks involved in the alignment study.

More specifically, in one embodiment, a feature of system 100 is that it enables the user to see how a state's or textbook's performance indicators within a selected content area (e.g., science) at a selected education level (e.g., elementary) map onto system 100's performance indicators within the selected content area at the selected education level, and vice-versa.

In one embodiment, information that provides a mapping between system 100's performance indicators and at least one state's and/or textbook's performance indicators is stored in system 100. Preferably, the information is stored in a relational database.

FIG. 8 illustrates example information 800 that may be stored within a database of system 100. This information includes the following: a list 802 of system 100's performance indicators for the science content area at the elementary education level, a list 804 of a state's (i.e., State A's) performance indicators for the science content area at the elementary education level, a list 806 of a textbook's (i.e., Textbook X's) performance indicators for the science content area at the elementary education level, and a table 810 that provides a mapping between system 100's performance indicators for the science content area at the elementary education level and the state's and the textbook's performance indicators for the same content area and education level. System 100 could have other information like that shown in FIG. 8 for other content areas (e.g., math, geography) at other education levels (e.g., middle school, high school).

As shown in FIG. 8, N performance indicators have been defined within system 100 for the science content area at the elementary education level, the first of these performance indicators (i.e., PI-1) has 4 different depths of knowledge (DOK), and the second (i.e., PI-2) has 1 DOK. FIG. 8 also shows that Textbook X is associated with J performance indicators for the science content area at the elementary education level, and State-A has K performance indicators for the science content area at the elementary education level. As also shown in FIG. 8, each performance indicator has a label that describes the performance indicator.

System 100 provides a user interface screen that the user can interact with to view and analyze an alignment between system 100's performance indicators and a state's and/or textbook's performance indicators. User interface screen 900 (see FIG. 9) is an example of a user interface screen that may be provided by system 100.

Referring now to FIG. 9, screen 900 includes a content area selection pull-down menu 902 that enables the user to select a content area, an education level selector 904 for enabling the user to select an education level, a state selection pull-down menu 906 for enabling the user to select a state, and a textbook selection pull-down menu 908 for enabling the user to select a textbook. Screen 900 further includes an elements of display selector 910, a viewpoint selector 912 that enables the user to select a output viewpoint, and a show data button 914.

Figure 10A:
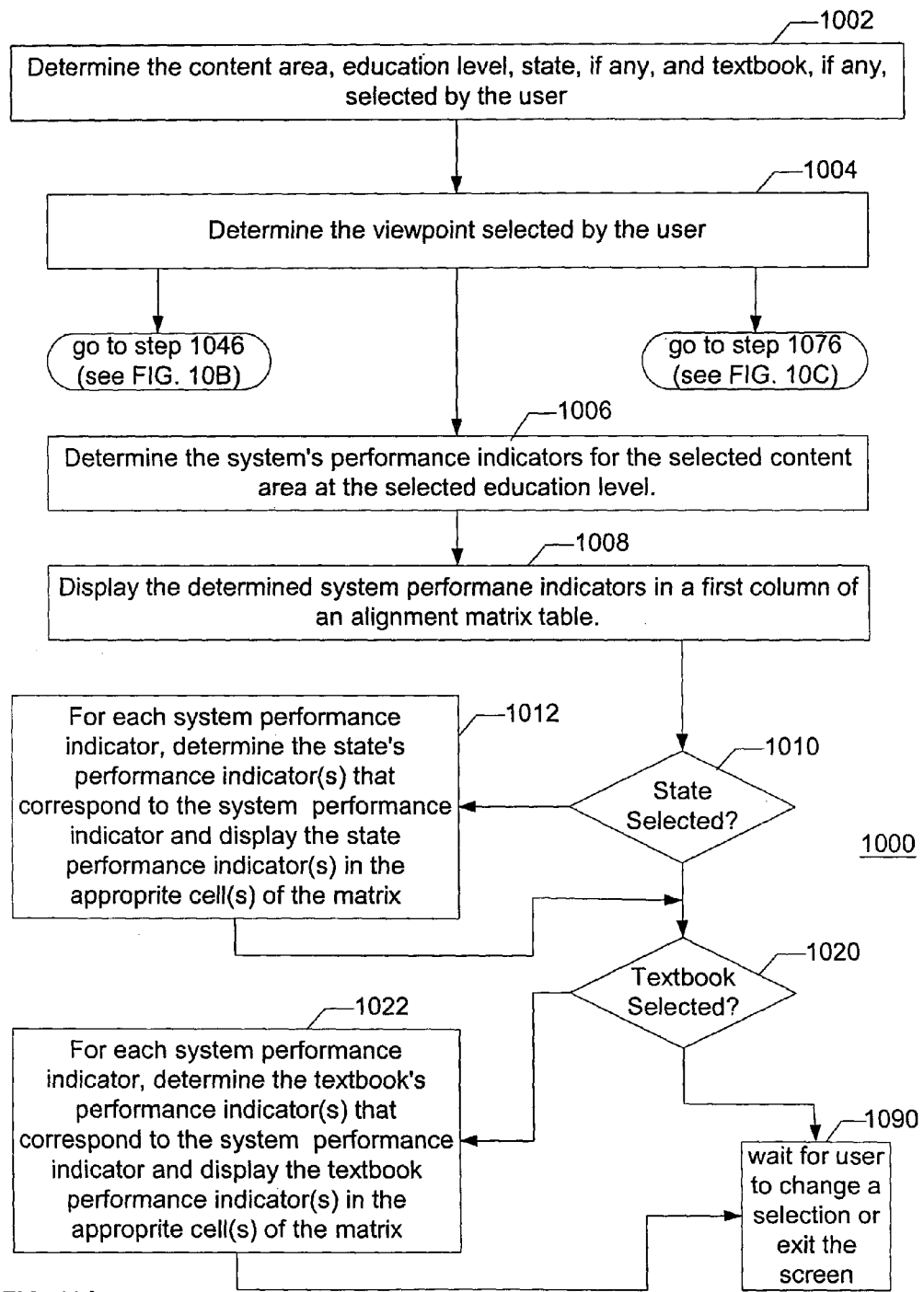
FIGS. 10A-C is a flow chart illustrating a process that may be performed by the system.
Figure 10B:
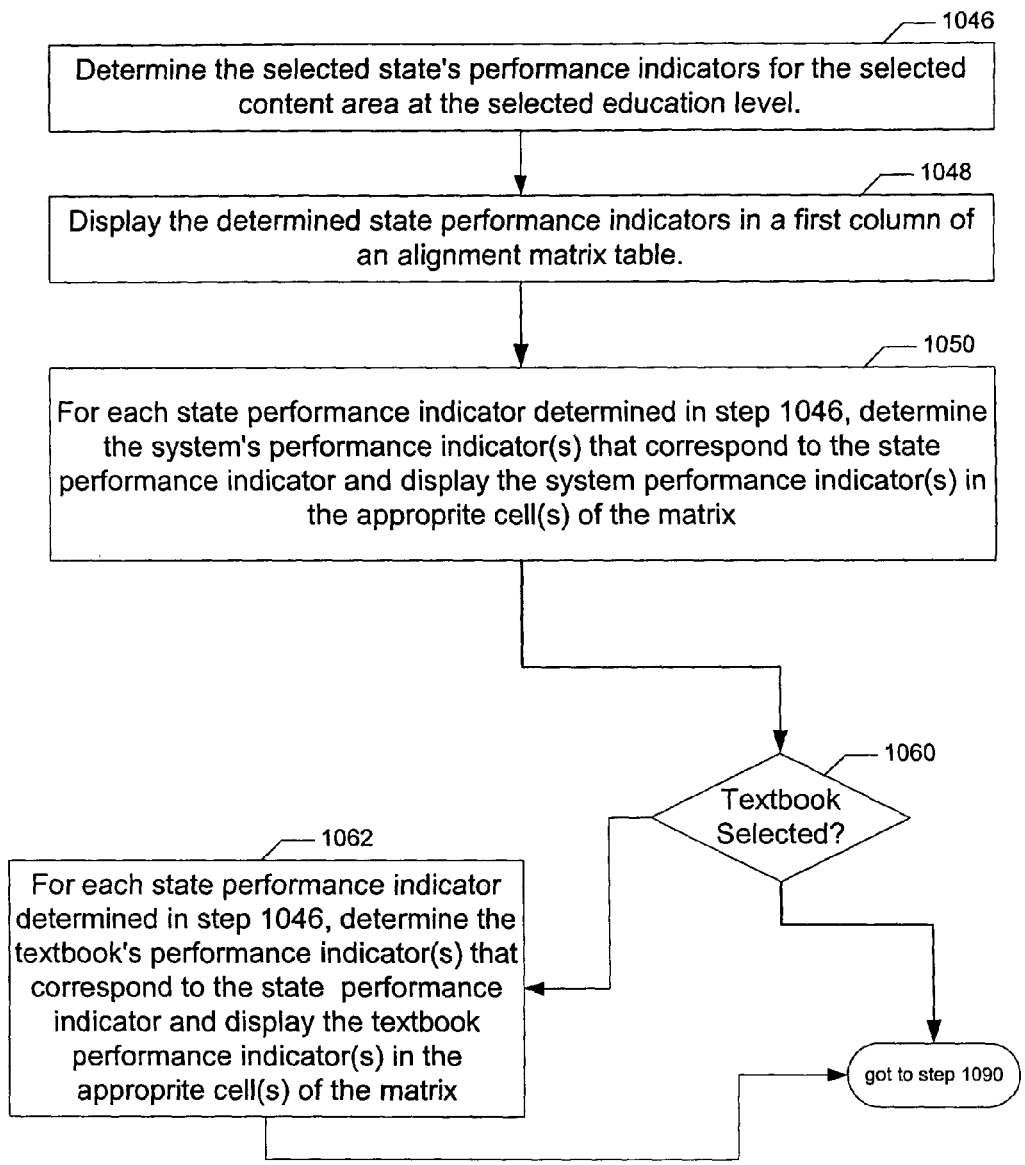
Figure 10C:
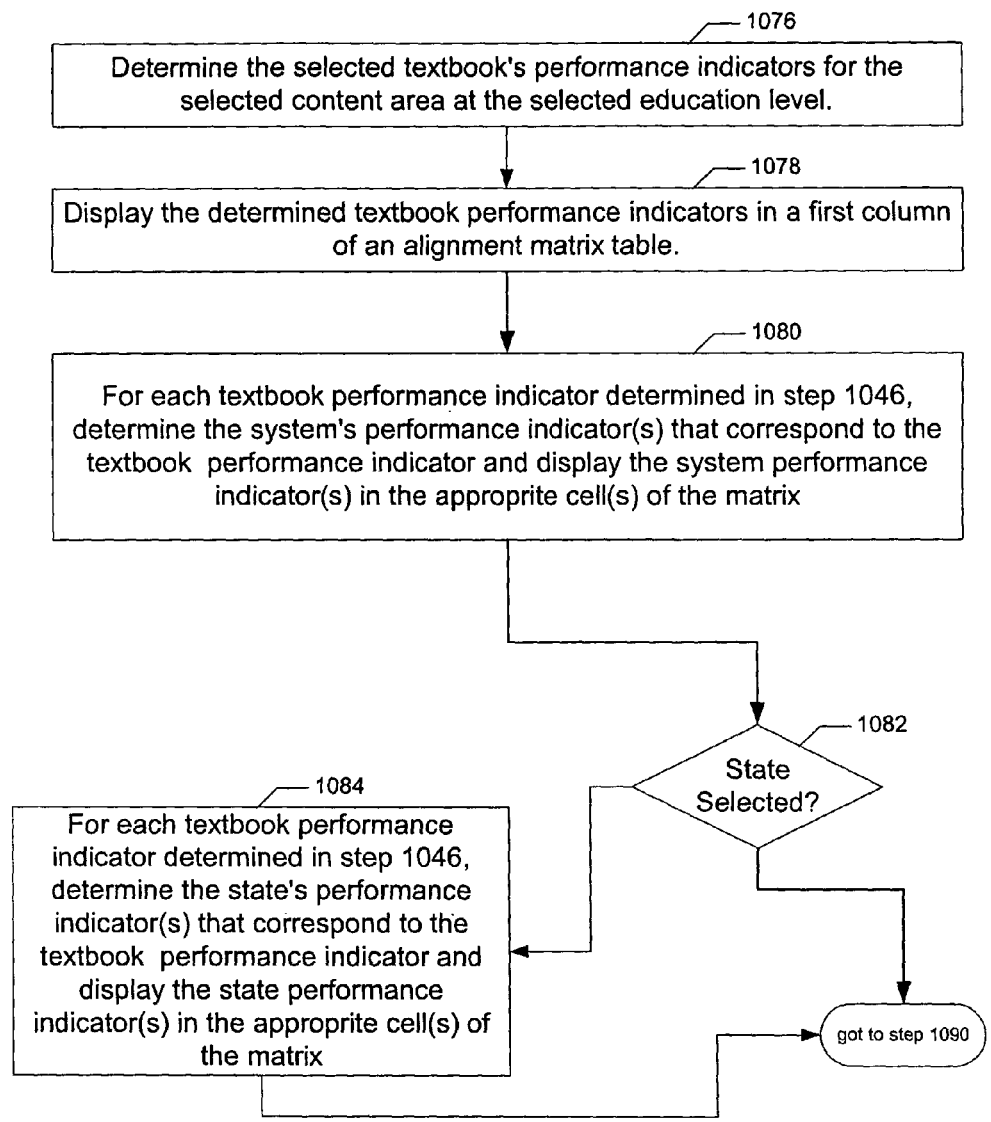
Figure 16:
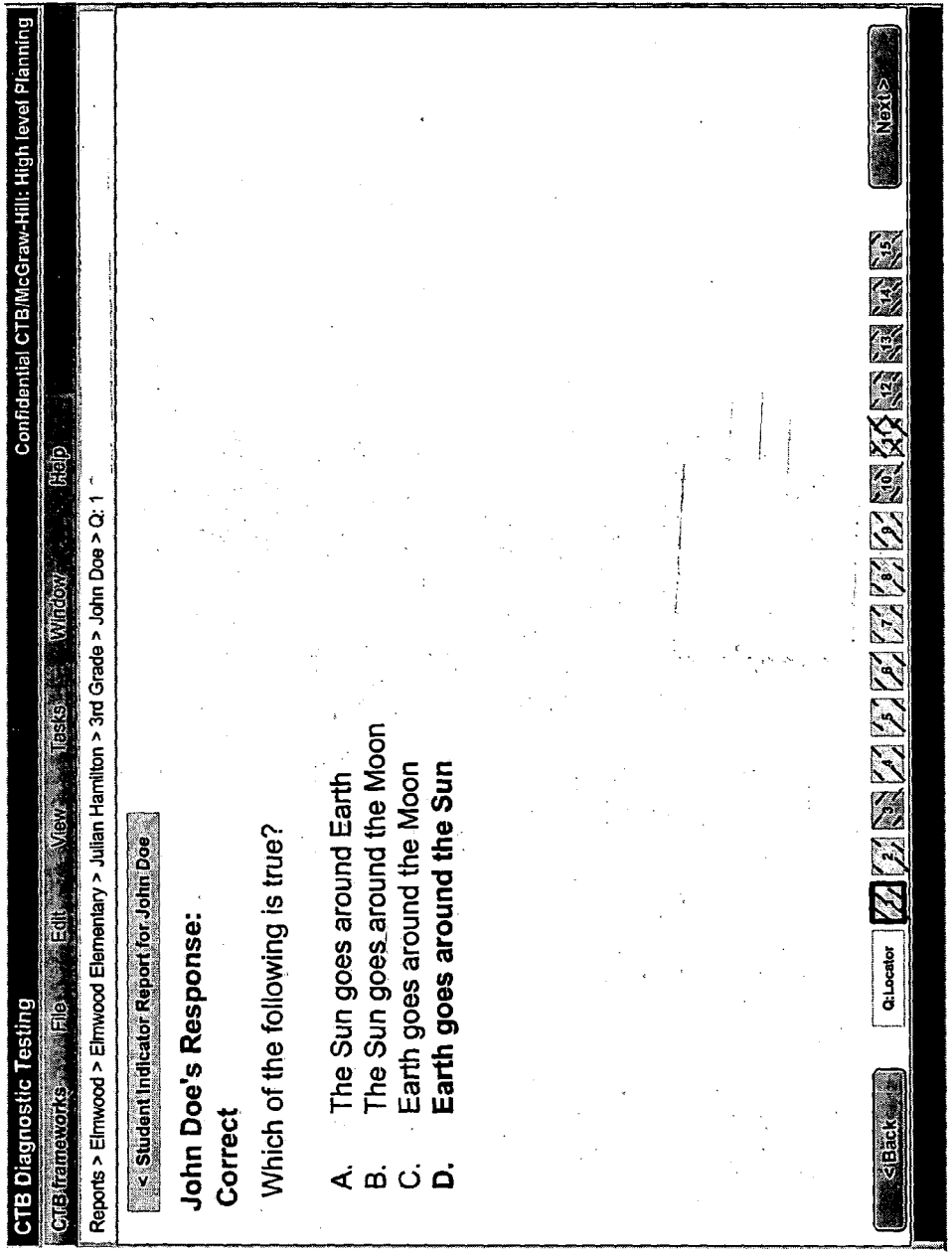

FIGS. 10A-C illustrate a process 1000 that may be performed by system 100 in response to the user selecting the show data button 914. Although process 1000 is depicted as an ordered sequence of steps, the steps need not necessarily be performed in the order shown. Moreover, it is contemplated that, in certain embodiments, steps may be added to and/or deleted from process 1000.

Referring now to FIG. 10A, in step 1002 system 100 determines the content area, education level, state, if any, and textbook, if any, selected by the user. Next (step 1004), system 100 determines the viewpoint selected by the user. If the user selected the CTB Standards viewpoint, then control passes to step 1006. If the user selected the State Standards viewpoint, then control passes to step 1046. And, if the user selected the Textbook Standards viewpoint, then control passes to step 1076.

In step 1006, system 100 determines system 100's performance indicators for the selected content area at the selected education level. This information is preferably stored in a database. Next (step 1008), system displays the determined system performance indicators in a first column 921 of an alignment matrix table 920.

Next (step 1010), system 100 determines whether the user selected a state from pull-down menu 906. If the user selected a state, control passes to step 1012, otherwise control passes to step 1020.

In step 1012, for each system 100 performance indicator included in column 921 of table 920, system 100 uses information stored in the database (e.g., the information from a table like table 810) to determine the selected state's performance indicators that correspond to the system 100 performance indicator (if any) and displays the determined state performance indicators in a column of table 920 (e.g., column 922) in the row corresponding to the system 100 performance indicator. After step 1012, the process continues to step 1020.

In step 1020, system 100 determines whether the user selected a textbook from pull-down menu 908. If the user selected a textbook, control passes to step 1022, otherwise control passes to step 1090, where system 100 waits for the user to change a selection or exit the screen.

In step 1022, for each system 100 performance indicator included in column 921 of table 920, system 100 uses information stored in the database to determine the selected textbook's performance indicators that correspond to the system 100 performance indicator (if any) and displays the determined textbook performance indicators in a column of table 920 (e.g., column 922) in the row corresponding to the system 100 performance indicator. After step 1022, the process continues to step 1090.

In step 1046, system 100 determines the selected state's performance indicators for the selected content area at the selected education level. Next (step 1048), system displays the determined state performance indicators in a first row 921 of an alignment matrix table 920.

Next (step 1050), for each state performance indicator included in column 921 of table 920, system 100 uses information stored in the database to determine the system 100 performance indicators that correspond to the state performance indicator (if any) and displays the determined system performance indicators in a column of table 920 (e.g., column 922) in the row corresponding to the state performance indicator. After step 1050, the process continues to step 1060.

In step 1060, system 100 determines whether the user selected a textbook from pull-down menu 908. If the user selected a textbook, control passes to step 1062, otherwise control passes to step 1090.

In step 1062, for each state performance indicator included in column 921 of table 920, system 100 uses information stored in the database to determine the selected textbook's performance indicators that correspond to the state performance indicator (if any) and displays the determined textbook performance indicators in a column of table 920 (e.g., column 922) in the row corresponding to the state performance indicator. After step 1062, the process continues to step 1090.

In step 1076, system 100 determines the selected textbook's performance indicators for the selected content area at the selected education level. Next (step 1078), system displays the determined textbook performance indicators in a first row 921 of an alignment matrix table 920.

Next (step 1080), for each textbook performance indicator included in column 921 of table 920, system 100 uses information stored in the database to determine the system 100 performance indicators that correspond to the textbook performance indicator (if any) and displays the determined system performance indicators in a column of table 920 (e.g., column 922) in the row corresponding to the textbook performance indicator. After step 1080, the process continues to step 1082.

In step 1082, system 100 determines whether the user selected a state from pull-down menu 906. If the user selected a state, control passes to step 1084, otherwise control passes to step 1090.

In step 1084, for each textbook performance indicator included in column 921 of table 920, system 100 uses information stored in the database to determine the selected state's performance indicators that correspond to the textbook performance indicator (if any) and displays the determined state performance indicators in a column of table 920 (e.g., column 922) in the row corresponding to the textbook performance indicator. After step 1084, the process continues to step 1090.

To give one example of how the above described alignment feature of system 100 can be used, assume a testing company (e.g., CTB McGraw-Hill, the assignee of the present invention) wants to build a middle school science test for the state of California. By selecting from the appropriate menus and buttons at the left side of the screen 900, it becomes possible to display in an alignment matrix the performance indicators in the testing company's framework that correspond to the performance indicators associated with each California standard (in this case Focus on Earth Science and Physical Science, Standard Various).

The alignment matrix 920 supports: (1) the selection of secure items (from system 100's item bank), aligned with a state's indicators, for use in a test that's being developed; (2) the election of sample items (from system 100's item bank) which accurately target the selected state's indicators at the intended depths of knowledge, for use by item writers and test content editors as models for item writing and editing to ensure that newly developed test items are closely aligned with the state's standards; (3) clarification of the item specifications to guide writers in developing items that accurately assess achievement of the state's standards; and (4) discussion about the scope and relative importance of each selected state performance indicator in support of the development of a test blueprint.

VI. Performance Reporting

System 100 may be programmed to provide performance reports.

FIG. 11 illustrates a group/class/school reporting interface 1100, according to one embodiment, that is provided by system 100. Menus and button on the left-hand side of interface 1100 provide ease of switching between student/class/school indicator reports. Color coding differentiates student knowledge for ease of getting an overall perspective on a group of students. The sizes of the color bands for the mini bar graphs for each indicator represent the percentage of students with that type of knowledge. The report indicates what some students know within a given level of certainty, what some students don't know within a given level of certainty, and that for some students their knowledge in the subject is unclear within a given level of certainty. Color coding also indicates that the student either was not tested, or that testing of this indicator at that level of knowledge is not relevant. The user can print the report or publish the report to the web (note this report can be on an intranet or protected internet site). Publishing the report indicates making it available for a wider audience than is currently able to view the report. It doesn't necessarily indicate that the report will change networks. This functionality could be used, for example, to allow legislators, district managers, parents, or others to view these screens from either a secure or insecure website. Security settings could be used to control access to information that would normally be accessible from this screen such as individual student performance or items. The user can click on a mini bar graph associated with a particular one of the listed indicators to get details about students in the class for the particular indicator.

FIG. 12 illustrates a Student Details interface 1200. Interface 1200 appears when the user double clicks on a performance indicator displayed in column 1104 of table 1102. For each student in the selected group, interface 1200 displays the student's knowledge for each depth of knowledge for the selected indicator. Report color-coding indicates what some students know within a given level of certainty, what some students don't know within a given level of certainty, and that for some students their knowledge in the subject is unclear within a given level of certainty.

Figure 13:
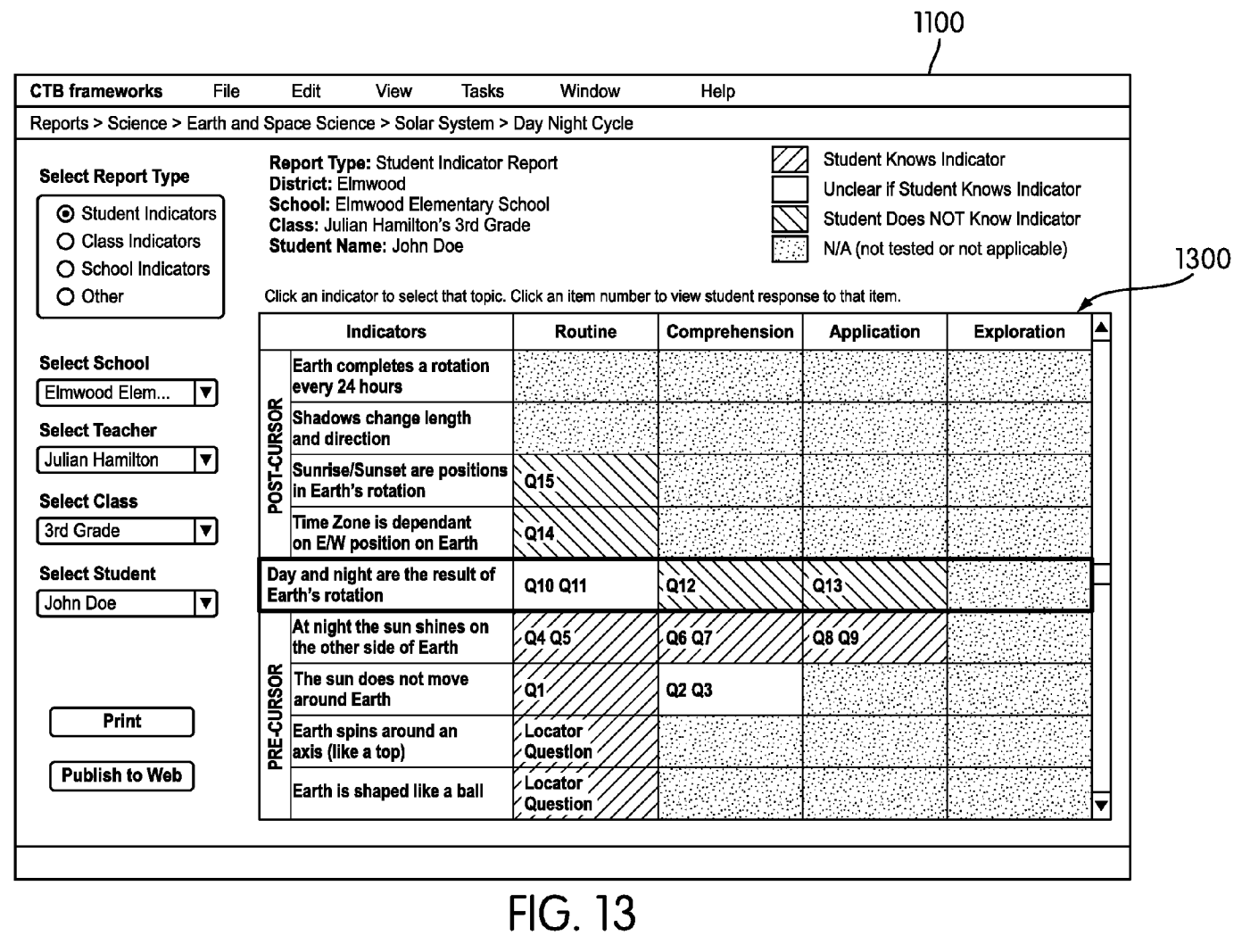

FIG. 13 illustrates interface 1100 after the user has selected to view a report for a selected individual student. As described above, the user can select an individual student by manipulating the buttons and menus shown on the left hand portion of interface 1100.

As represented in FIG. 13, report color-coding indicates what the selected student knows regarding the subject within a given level of certainty, what the student doesn't know within a given level of certainty, and where the student's knowledge in the subject is unclear within a given level of certainty. The report also indicates correct or incorrect responses (partially correct responses may use the same color as incorrect responses).

As shown in FIG. 13, the student was given two locator questions. Locator question are typically used to reduce the number of questions that the student needs to answer in order to evaluate the student knowledge of a particular indicator. In some sense, locator questions "locate" the student within a framework.

More specifically, a locator question is typically a short question that will take the student a short time to complete and which will give system 100 an idea of where to start testing the student in terms of stages of learning and depths of knowledge for a given section of content. The locator question is used to locate a starting item in a set of items, select from a set of predefined item sets, or increase/decrease the number of items presented to the student from one or more items sets. Use of the locator questions may result in a reduction in the amount of testing time for each particular student or adaptation of the assessment for one or more subsets of the content for each particular student or both.

Although locator questions are used for adaptive testing, the comprehensive, detailed framework using stages of learning and depths of knowledge may be used to characterize content for any assessment type including formative, summative, benchmark, diagnostic, high-stakes, low-stakes, homework, etc (any or all of which may, or may not be adaptive). This comprehensive, detailed framework using stages of learning and depths of knowledge can be used to create a profile of the student, which can be updated based on any or all of the assessments given to an individual student, so long as the content of those assessments is developed with respect to, or developed independently of, and matched to, the same comprehensive, detailed framework using stages of learning and depths of knowledge.

The user has access to the student responses to each question (except for "high-stakes" questions) by clicking on the desired question number displayed in table 1300. Color coding also indicates that the student either was not tested, or that testing of this indicator at that level of knowledge is not relevant. The user can print the report or publish the report to the web (note this report can be an intranet or protected internet site).

FIG. 14 illustrates a Student Grouping for Target Indicator Screen 1400. Screen 1400 allows students to be grouped by knowledge criteria, for example, similar or complementary knowledge as defined by the system. Report color-coding indicates what the student knows within a given level of certainty, what the student doesn't know within a given level of certainty, or that the student's knowledge in the subject is unclear within a given level of certainty. The user may select the number of groups desired. Defaults for number of groups could be controlled from a preferences menu. Students can be grouped into groups of equal or unequal numbers according to preferences set by the user.

System 100 may provide a feature that enables the user to view a student's response to each item in an assessment previously given to the student. Additionally, system 100 enables the user to not only see the student's response to the items, but also the items themselves. This feature is illustrated in FIGS. 15-30. FIG. 15 illustrates a screen 1500 that displays the assessment's locator item and the student's responses to the item. Similarly, FIGS. 16-30 display items 1-15, respectively, and the student's response(s) thereto.

As shown in FIGS. 15-30, the screens presented to the user include buttons that enable the user to move from one item to the next by activating the "Next" button or to a previous item by activating the "Back" button. Additionally, the user may jump to a particular item by clicking on the corresponding item number from the set of item numbers 1540 displayed at the bottom of the screen. The screens indicate correct, partially correct, or incorrect responses and the items of 1540 are color-coded to indicate correct (green) and incorrect (pink) responses.

Figure 18:
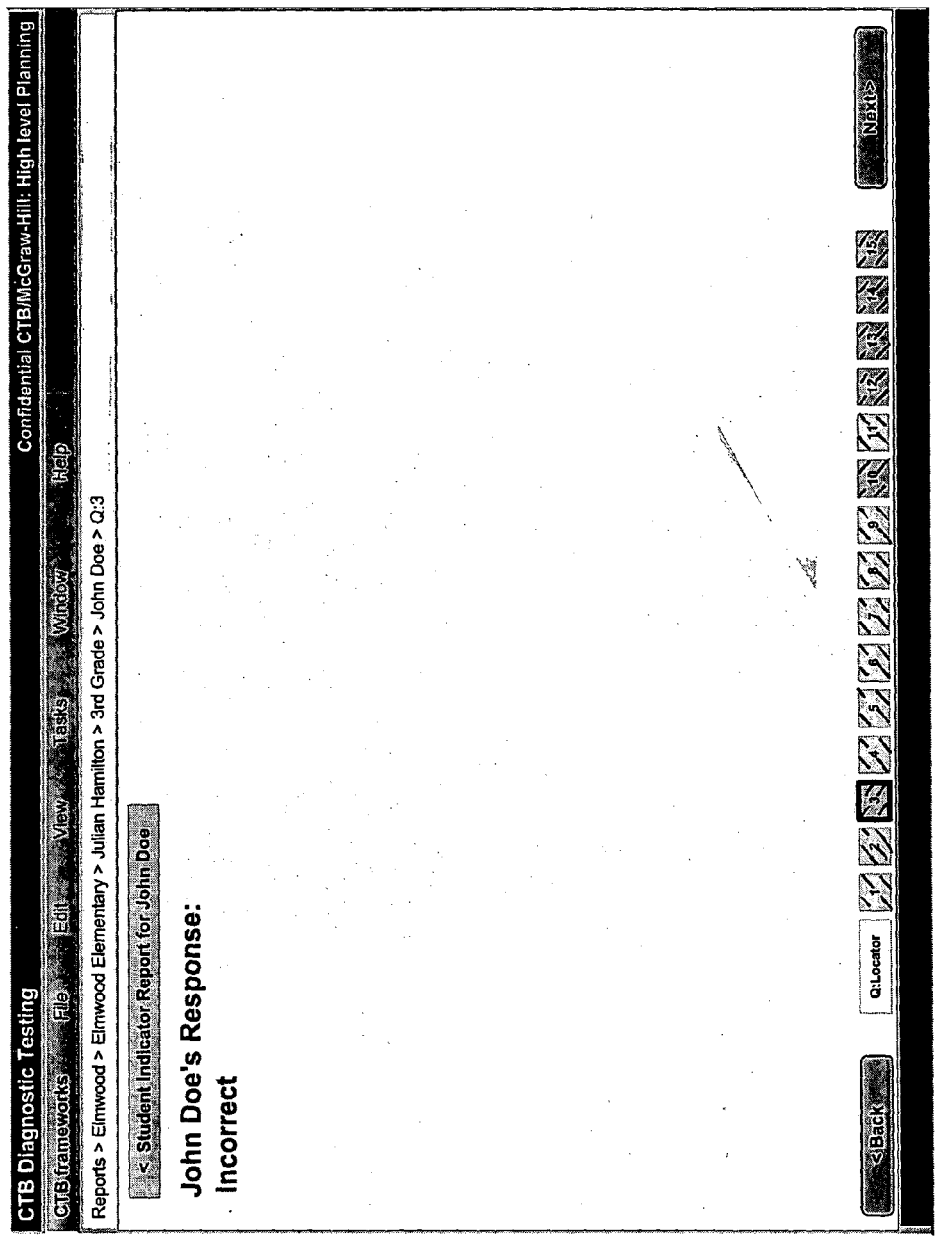
Figure 19:
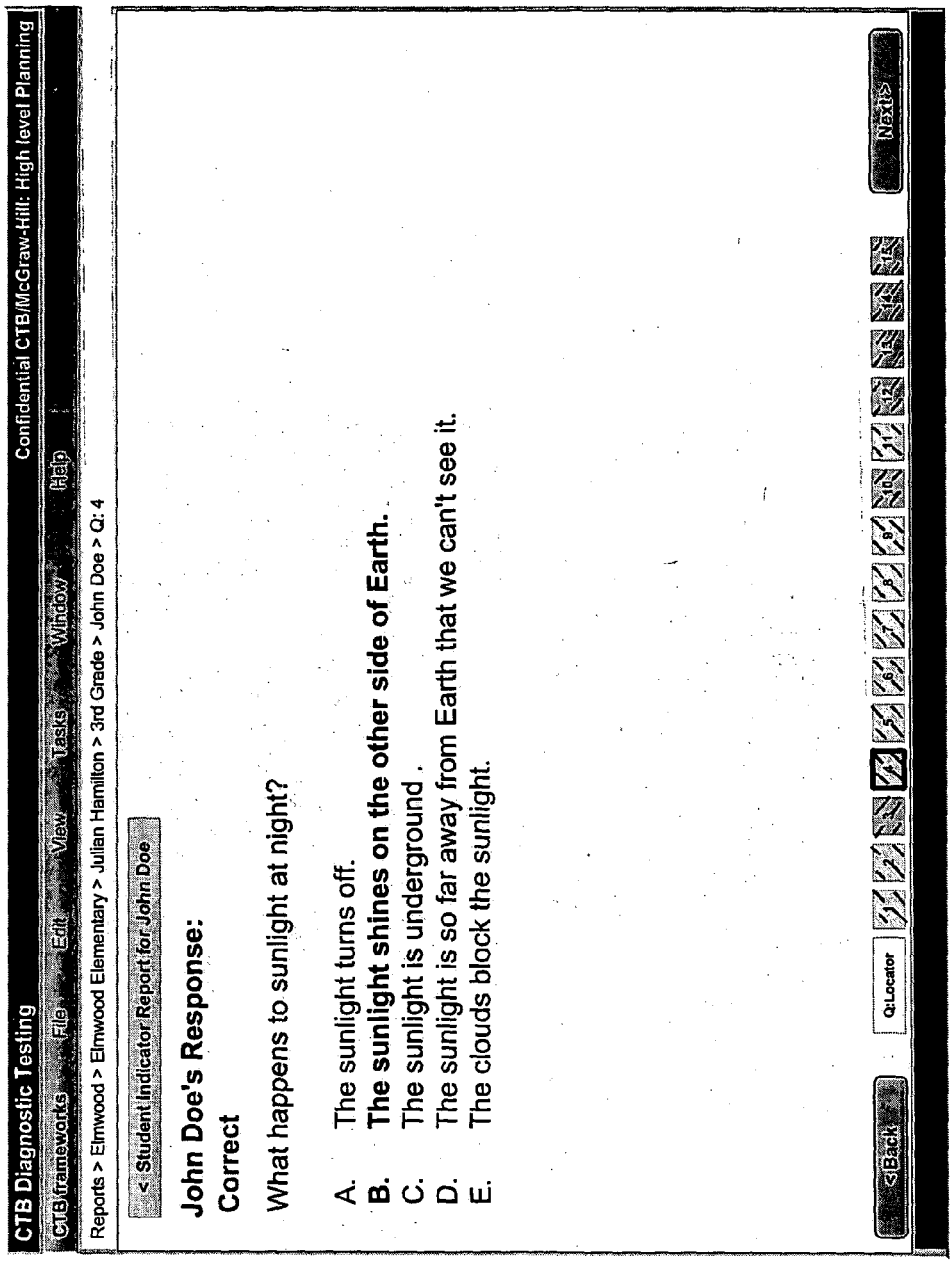
Figure 20:
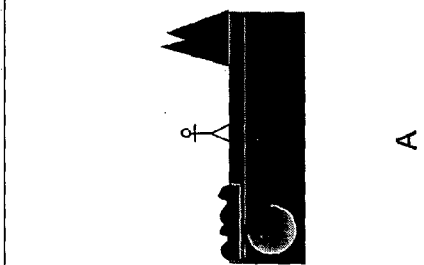
Figure 22:
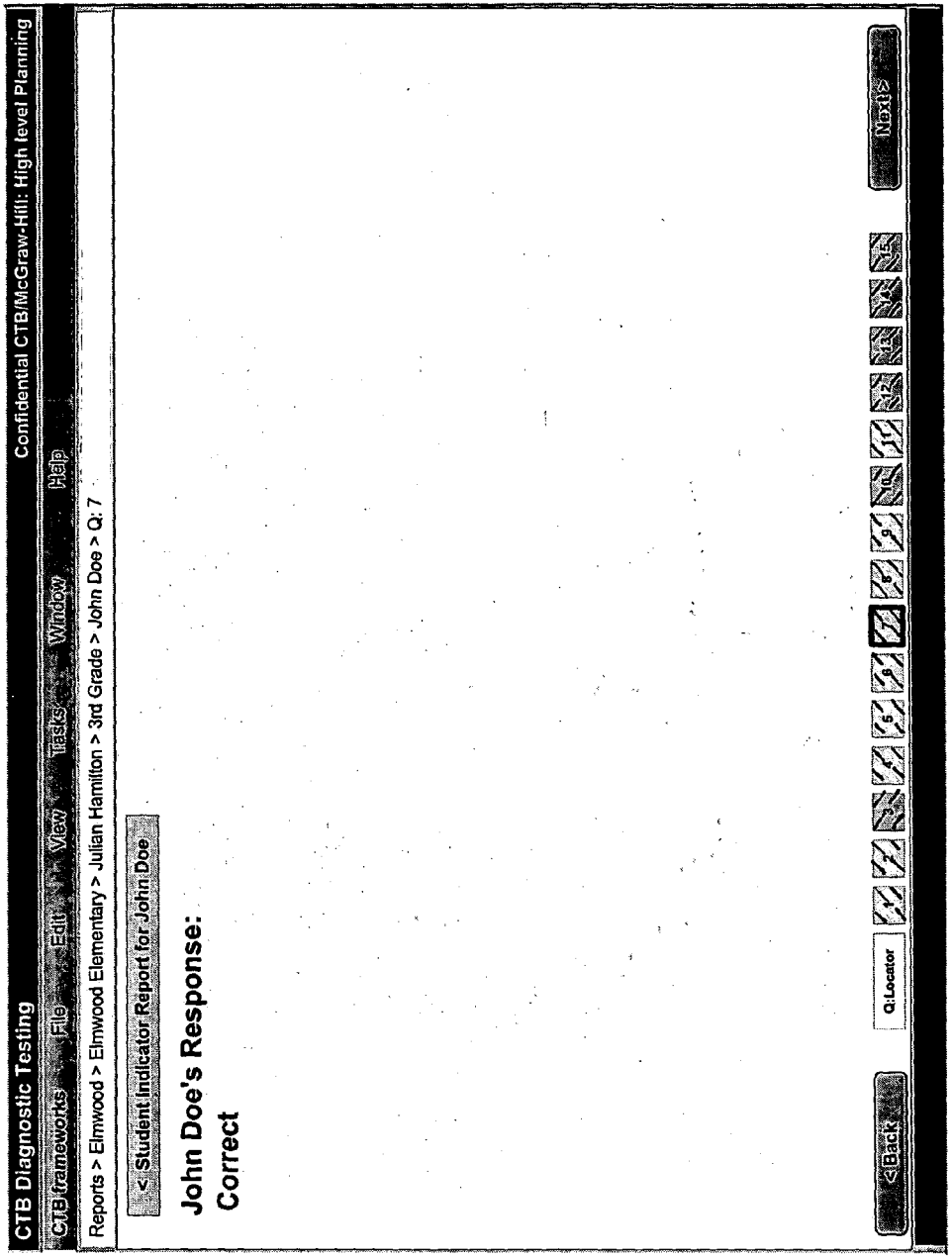
Figure 23:
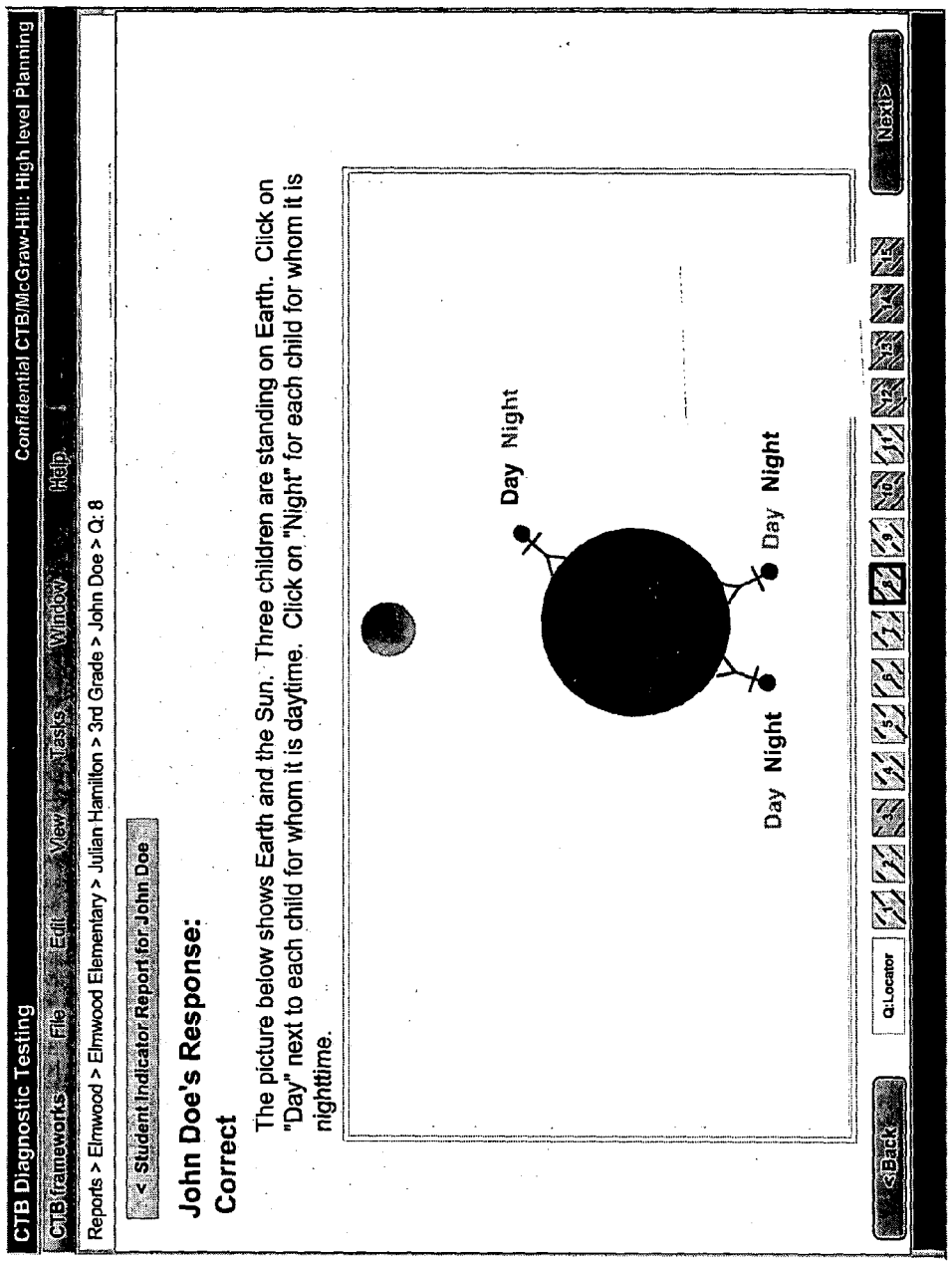
Figure 29:
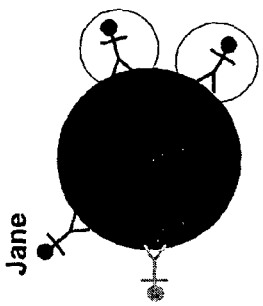
Figure 26:
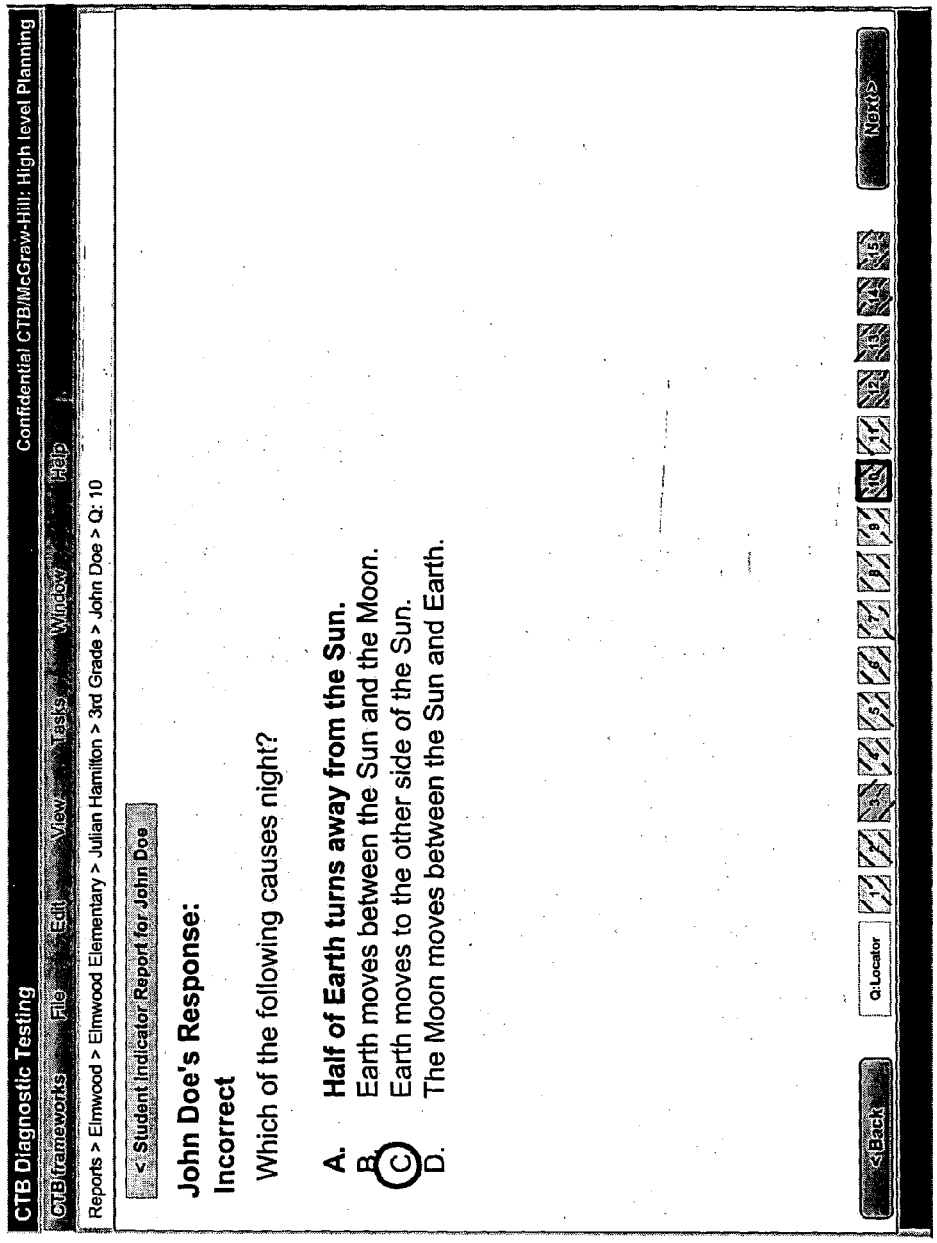
Figure 26:
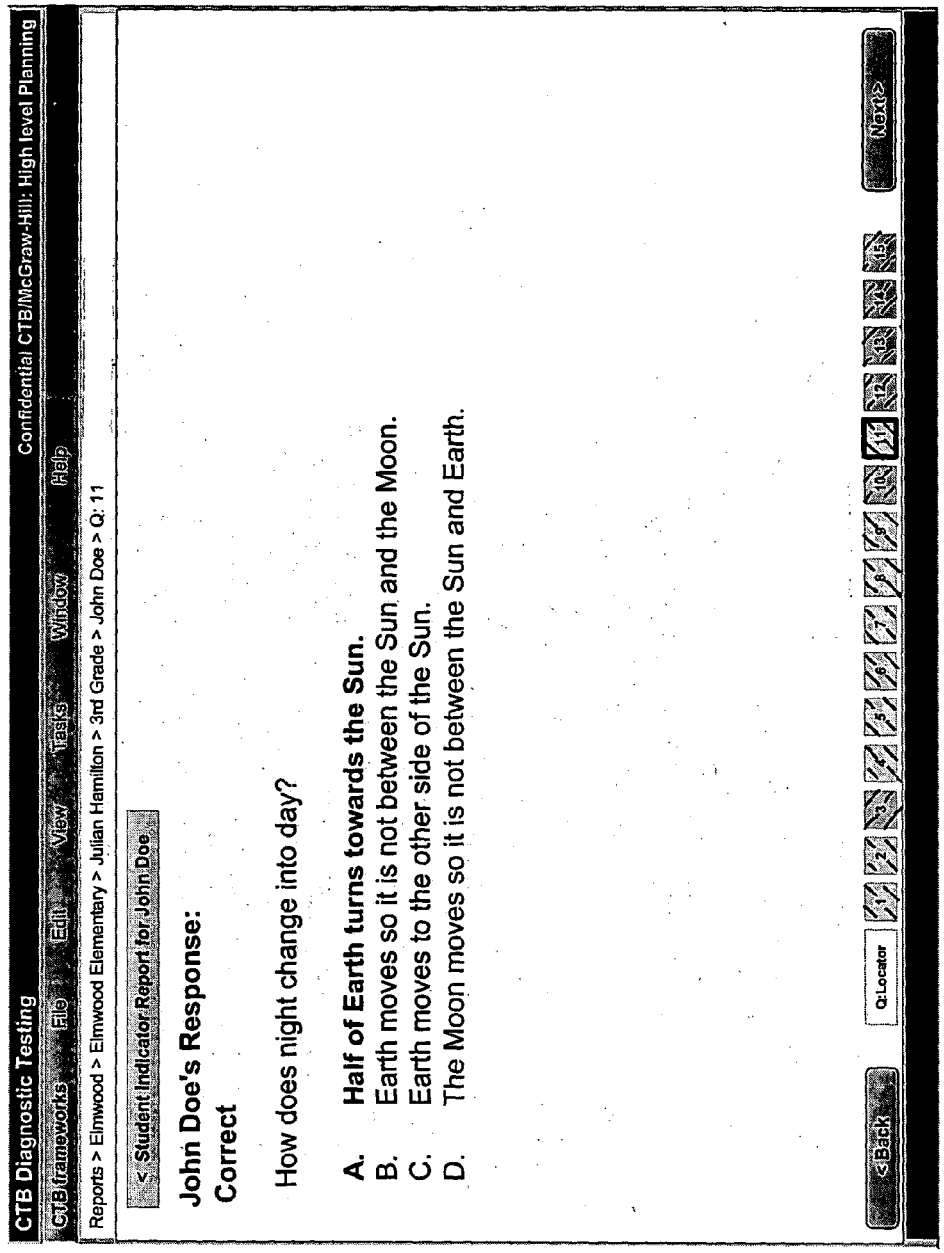
Figure 30:
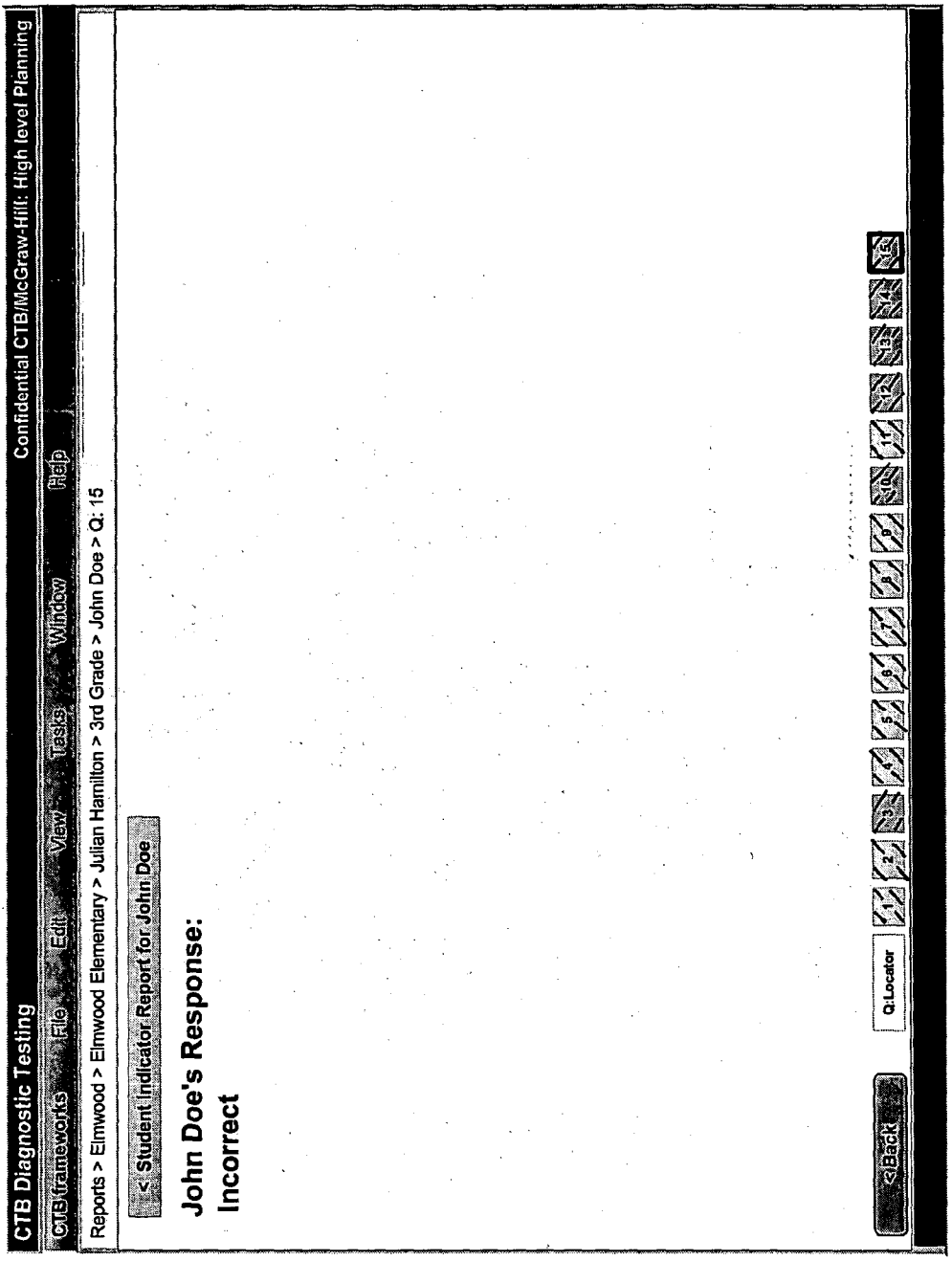

Viewing of responses to high stakes items may be blocked except for correct, incorrect, partially correct (see FIGS. 18, 22, and 30). Highlighting or circles or other indicia may be used to indicate areas of interest in the item response. All responses shown are in the context of the item as it was presented to the student, or a recreation of the student response from a response by a student who used different medium for their response. For example, when the response was generated by the student using paper and pencil, and the user is subsequently viewing the response in a browser window on a computer. Such recreated responses may be multiple choice or constructed response items and may or may not be linked to images of the actual paper responses. Indicator and depth of knowledge for each item are shown as tool tip on mouse over for each item number in set 1540.

Figure 21:
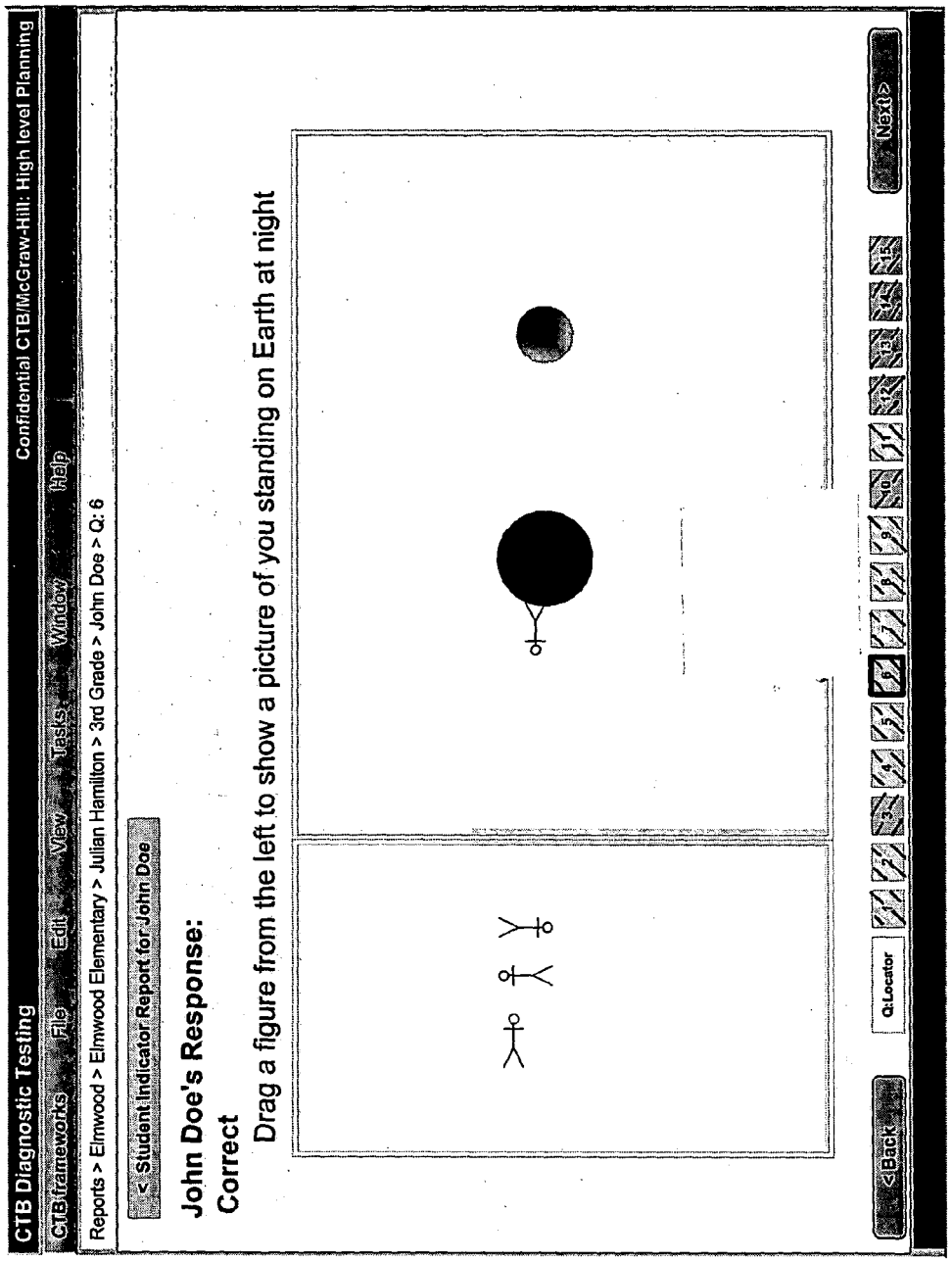
Figure 28:
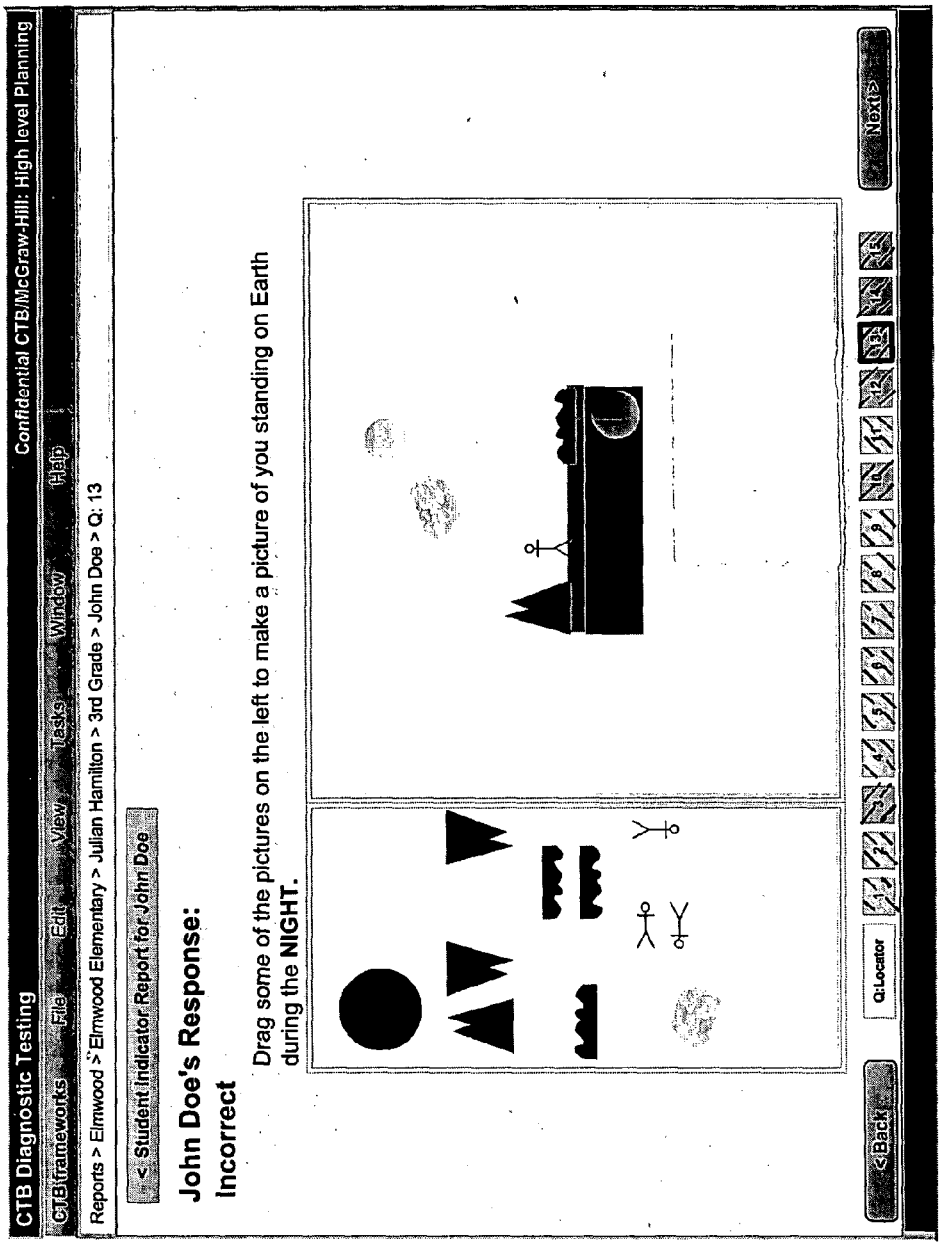
Figure 29:
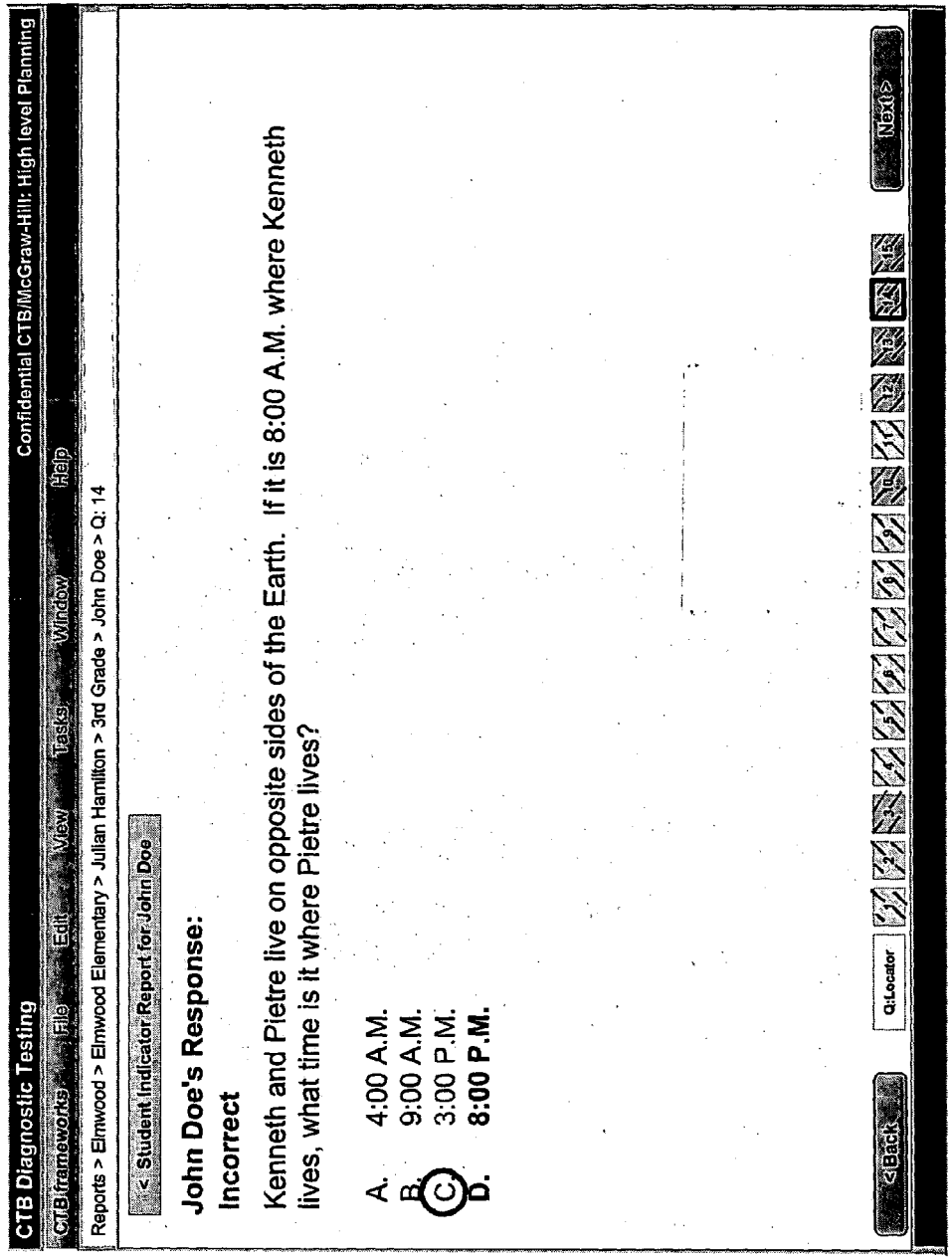

FIGS. 21 and 28 illustrate examples of items wherein the student is requested to manipulate various devices into arrangements, or patterns, to demonstrate understanding of relationships between specified concepts, each of which is represented by and associated with one of the devices. This type of item construction and development is more fully described in a provisional patent application entitled "A Method and System For Creating, Administering, and Automating Scoring of Dimensional Modeling Constructed Response Items" (Ser. No. 60/404,393) filed Aug. 20, 2002, the disclosure of which is incorporated herein by reference.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer-implemented method for modifying or creating an academic achievement test, said method comprising:
   storing, in a database system, indicators for each of a plurality of content areas, each indicator comprising a learning target;
   defining and storing in the database system relational associations among the stored indicators, whereby, for at least a portion of the indicators stored, each indicator is associated with at least one other indicator that is a pre-cursor of the associated indicator and at least one other indicator that is a post-cursor of the associated indicator, wherein an indicator that is a pre-cursor of an associated indicator relates to knowledge a student should have before being taught the associated indicator, and an indicator that is a post-cursor of an associated indicator relates to knowledge a student should acquire more readily after being taught the associated indicator;
   storing, in the database system, a plurality of test items and associating each test item with one of the stored indicators;

enabling a user, via a user interface unit, to select a content area for which the user wishes to develop testing material;

enabling the user to select, via the user interface unit, a topic within the selected content area for which the user wishes to develop testing material, wherein a topic comprises a growth strand including indicators associated in pre-cursor and post-cursor relationships;

enabling the user to select, via the user interface unit, one of the indicators of the selected topic as a target indicator, wherein the selected target indicator has one or more depths of knowledge associated therewith;

in response to receiving a target indicator selection from the user:

determining, via an information processor executing software instructions retrieved from a software store, from the stored relational associations, at least one pre-cursor indicator of the target indicator and at least one post-cursor indicator of the target indicator, and identifying, via the information processor, from the stored plurality of test items, test items associated with the target indicator, test items associated with the at least one pre-cursor indicator, and test items associated with the at least one post-cursor indicator;

displaying to the user, via the user interface unit, the target indicator and item identifiers corresponding to the test items associated with the target indicator, the at least one pre-cursor indicator and item identifiers corresponding to the test items associated with the pre-cursor indicator, and the at least one post-cursor indicator and item identifiers corresponding to the test items associated with the post-cursor indicator in such a manner as to indicate which of the displayed item identifiers are associated with the target indicator, which of the displayed item identifiers are associated with the pre-cursor indicator, and which of the displayed item identifiers are associated with the post-cursor indicator; and generating a new, or modifying a previously existing, academic achievement test by receiving, via the interface unit, a user's selection of any of the displayed item identifiers and a user's specification that the test item corresponding to the selected item identifier be added to or removed from the academic achievement test and adding or removing the specified test items to or from the academic achievement test.

2. The method of claim 1, wherein the displaying step comprises displaying, via the user interface unit, a user interface screen comprising an item selection matrix for presenting the item identifiers.

3. The method of claim 2, wherein the item selection matrix comprises a plurality of rows and a plurality of columns, each row corresponding to an indicator and each column corresponding to a depth of knowledge.

4. The method of claim 3, wherein, for each test item identified in the identifying step, the identifier for the test item is displayed in the row corresponding to the indicator with which the test item identified by the identifier is associated.

5. The method of claim 4, wherein, for each test item identified in the identifying step, the identifier for the test item is displayed in the column corresponding to the depth of knowledge with which the test item identified by the identifier is associated.

6. The method of claim 5, wherein each row of the matrix corresponds to either a post-cursor of the selected target indicator, a pre-cursor of the selected target indicator, or the selected target indicator itself.

7. The method of claim 6, further comprising the steps of:
displaying at least a portion of the rows of the matrix corresponding to the target indicator with a first background color;
displaying at least a portion of the rows of the matrix corresponding to pre-cursors with a second background color; and
displaying at least a portion of the rows of the matrix corresponding to post-cursors with a third background color.

8. The method of claim 1, further comprising the step of enabling the user to select one recommended test from a set of available recommended tests.

9. The method of claim 8, further comprising the steps of:
receiving an indication that the user has selected one recommended test from the set of available recommended tests; and
after receiving the indication that the user has selected the one recommended test, displaying to the user an item identifier for each item included in the selected recommended test.

10. The method of claim 1, further comprising:
enabling the user to select any of the displayed item identifiers; and
displaying to the user the item corresponding to the item identifier selected by the user.

11. An educational administrative computer system comprising:
a user interface unit;
an information processor; and
a database system,
wherein the system is associated with one or more sets of learning targets, with each set of learning targets being associated with a content area and an education level, and wherein the information processor includes a software storage unit, said software storage unit storing instructions which, when executed by the information processor, cause the information processor to:
receive a user's content area selection from the user interface unit;
receive a user's education level selection from the user interface unit;
receive a user's state selection from the user interface unit, wherein the selected state is associated with one or more sets of state performance indicators, with each set of said state performance indicators being associated with a content area and an education level;
display, via the user interface unit, a first column of a table each of the learning targets included in the set of learning targets associated with the selected content area and education level; and
for each learning target displayed in the first column of the table, determine the selected state's performance indicator(s) corresponding to the learning target and display, via the user interface unit, said state's performance indicator(s) in a cell of the table that is in the same row as the learning target and in a second column of the table.

12. The system of claim 11, wherein said software storage unit further stores instructions which, when executed by the information processor, cause the information processor to enable the user, via the user interface unit, to select a viewpoint and updating the table so that the table corresponds to the selected viewpoint.

* * * * *